United States Patent
Roddy et al.

(10) Patent No.: US 7,743,828 B2
(45) Date of Patent: *Jun. 29, 2010

(54) METHODS OF CEMENTING IN SUBTERRANEAN FORMATIONS USING CEMENT KILN CEMENT KILN DUST IN COMPOSITIONS HAVING REDUCED PORTLAND CEMENT CONTENT

(75) Inventors: Craig W. Roddy, Duncan, OK (US); Jiten Chatterji, Duncan, OK (US); D. Chad Brenneis, Marlow, OK (US); Ronnie G. Morgan, Waurika, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,381

(22) Filed: Oct. 27, 2009

(65) Prior Publication Data

US 2010/0044043 A1 Feb. 25, 2010

Related U.S. Application Data

(60) Continuation-in-part of application No. 12/420,630, filed on Apr. 8, 2009, now Pat. No. 7,631,692, which is a continuation-in-part of application No. 12/349,676, filed on Jan. 7, 2009, now Pat. No. 7,674,332, which is a division of application No. 12/034,886, filed on Feb. 21, 2008, now Pat. No. 7,478,675, which is a continuation-in-part of application No. 11/223,669, filed on Sep. 9, 2005, now Pat. No. 7,445,669.

(51) Int. Cl.
*E21B 33/138* (2006.01)
*E21B 33/14* (2006.01)
*C09K 8/467* (2006.01)

(52) U.S. Cl. ............... 166/277; 106/679; 106/705; 106/819; 166/292; 166/309

(58) Field of Classification Search ............ None
See application file for complete search history.

(56) References Cited

U.S. PATENT DOCUMENTS

| | | | |
|---|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Williams |
| 2,871,133 A | 1/1959 | Palonen et al. |
| 2,880,096 A | 3/1959 | Hurley |
| 2,945,769 A | 7/1960 | Gama et al. |
| 3,168,139 A | 2/1965 | Kennedy et al. |
| 3,454,095 A | 7/1969 | Messenger et al. |
| 3,467,193 A | 9/1969 | McColl et al. |
| 3,499,491 A | 3/1970 | Wyant et al. |
| 3,557,876 A | 1/1971 | Tragesser |
| 3,748,159 A | 7/1973 | George |
| 3,876,005 A | 4/1975 | Fincher et al. |
| 3,887,009 A | 6/1975 | Miller et al. |
| 3,887,385 A | 6/1975 | Quist et al. |
| 4,018,617 A | 4/1977 | Nicholson |
| 4,031,184 A | 6/1977 | McCord |
| 4,036,301 A | 7/1977 | Powers et al. |
| 4,101,332 A | 7/1978 | Nicholson |
| 4,176,720 A | 12/1979 | Wilson |
| 4,268,316 A | 5/1981 | Wills et al. |
| 4,341,562 A | 7/1982 | Ahlbeck |
| RE31,190 E | 3/1983 | Detroit et al. |
| 4,407,677 A | 10/1983 | Wills et al. |
| 4,432,800 A | 2/1984 | Kneller et al. |
| 4,435,216 A | 3/1984 | Diehl et al. |
| 4,436,850 A | 3/1984 | Burdick et al. |
| 4,460,292 A | 7/1984 | Durham et al. |
| 4,494,990 A | 1/1985 | Harris |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,676,317 A | 6/1987 | Fry et al. |
| 4,676,832 A | 6/1987 | Childs et al. |
| 4,741,782 A | 5/1988 | Styron |
| 4,784,223 A | 11/1988 | Worrall et al. |
| 4,883,125 A | 11/1989 | Wilson et al. |
| 4,941,536 A | 7/1990 | Brothers et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |

(Continued)

FOREIGN PATENT DOCUMENTS

CA 2336077 1/2000

(Continued)

OTHER PUBLICATIONS

U.S. Appl. No. 12/544,915, filed Aug. 20, 2009, Roddy.

(Continued)

*Primary Examiner*—George Suchfield
(74) *Attorney, Agent, or Firm*—Craig W. Roddy; Tumey, L.L.P.

(57) ABSTRACT

The present invention includes methods of cementing in subterranean formations using cement kiln dust in compositions having reduced Portland cement content. An embodiment of a method comprises placing a sealant composition that comprises cement kiln dust and is essentially free of Portland cement in a subterranean formation; and allowing the sealant composition to set.

32 Claims, No Drawings

U.S. PATENT DOCUMENTS

| | | |
|---|---|---|
| 5,183,505 A | 2/1993 | Spinney |
| 5,213,160 A | 5/1993 | Nahm et al. |
| 5,215,585 A | 6/1993 | Luthra et al. |
| 5,238,064 A | 8/1993 | Dahl et al. |
| 5,252,128 A | 10/1993 | Gopalkrishnan |
| 5,266,111 A | 11/1993 | Barbour |
| 5,295,543 A | 3/1994 | Terry et al. |
| 5,305,831 A | 4/1994 | Nahm |
| 5,314,022 A | 5/1994 | Cowan et al. |
| 5,327,968 A | 7/1994 | Onan et al. |
| 5,337,824 A | 8/1994 | Cowan |
| 5,352,288 A | 10/1994 | Mallow |
| 5,358,044 A | 10/1994 | Hale et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,382,290 A | 1/1995 | Nahm et al. |
| 5,383,521 A | 1/1995 | Onan et al. |
| 5,383,967 A | 1/1995 | Chase |
| 5,398,758 A | 3/1995 | Onan et al. |
| 5,423,379 A | 6/1995 | Hale et al. |
| 5,439,056 A | 8/1995 | Cowan |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,144 A | 12/1995 | Nahm et al. |
| 5,494,513 A | 2/1996 | Fu et al. |
| 5,499,677 A | 3/1996 | Cowan |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,569,324 A | 10/1996 | Totten et al. |
| 5,580,379 A | 12/1996 | Cowan |
| 5,585,333 A | 12/1996 | Dahl et al. |
| 5,588,489 A | 12/1996 | Chatterji et al. |
| 5,673,753 A | 10/1997 | Hale et al. |
| 5,688,844 A | 11/1997 | Chatterji et al. |
| 5,711,383 A | 1/1998 | Terry et al. |
| 5,716,910 A | 2/1998 | Totten et al. |
| 5,728,654 A | 3/1998 | Dobson et al. |
| 5,795,924 A | 8/1998 | Chatterji et al. |
| 5,820,670 A | 10/1998 | Chatterji et al. |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,060,434 A | 5/2000 | Sweatman et al. |
| 6,060,535 A | 5/2000 | Villar et al. |
| 6,063,738 A | 5/2000 | Chatterji et al. |
| 6,098,711 A | 8/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,402,833 B1 | 6/2002 | O'Hearn et al. |
| 6,409,819 B1 | 6/2002 | Ko |
| 6,457,524 B1 | 10/2002 | Roddy |
| 6,478,869 B2 | 11/2002 | Reddy et al. |
| 6,488,763 B2 | 12/2002 | Brothers et al. |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,610,139 B2 | 8/2003 | Crook et al. |
| 6,626,243 B1 | 9/2003 | Go Boncan |
| 6,645,290 B1 | 11/2003 | Barbour |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,823,940 B2 | 11/2004 | Reddy et al. |
| 6,832,652 B1 | 12/2004 | Dillenbeck et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,022,755 B1 | 4/2006 | Chatterji et al. |
| 7,048,053 B2 | 5/2006 | Santra et al. |
| 7,077,203 B1 | 7/2006 | Roddy et al. |
| 7,174,962 B1 | 2/2007 | Roddy et al |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 | 5/2007 | Roddy et al. |
| 7,284,609 B2 | 10/2007 | Roddy et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,353,870 B2 * | 4/2008 | Roddy et al. ................ 166/293 |
| 7,381,263 B2 | 6/2008 | Roddy et al. |
| 7,387,675 B2 | 6/2008 | Roddy et al. |
| 7,395,860 B2 | 7/2008 | Roddy et al. |
| 7,404,855 B2 | 7/2008 | Chatterji et al. |
| 7,409,990 B1 | 8/2008 | Burts et al. |
| 7,445,669 B2 | 11/2008 | Roddy et al. |
| 7,478,675 B2 | 1/2009 | Roddy et al. |
| 7,607,482 B2 | 10/2009 | Roddy et al. |
| 7,607,484 B2 | 10/2009 | Roddy et al. |
| 7,631,692 B2 * | 12/2009 | Roddy et al. ........... 166/250.14 |
| 7,674,332 B2 * | 3/2010 | Roddy et al. ................ 106/716 |

| | | | |
|---|---|---|---|
| 2002/0033121 | A1 | 3/2002 | Marko |
| 2002/0073897 | A1 | 6/2002 | Trato |
| 2002/0117090 | A1 | 8/2002 | Ku |
| 2003/0116065 | A1 | 6/2003 | Griffith et al. |
| 2003/0116887 | A1 | 6/2003 | Scott |
| 2003/0167970 | A1 | 9/2003 | Polston |
| 2004/0007162 | A1 | 1/2004 | Morioka et al. |
| 2004/0040475 | A1 | 3/2004 | De La Roij et al. |
| 2004/0079260 | A1 | 4/2004 | Datta et al. |
| 2004/0107877 | A1 | 6/2004 | Getzlaf et al. |
| 2004/0108113 | A1 | 6/2004 | Luke et al. |
| 2004/0112600 | A1 | 6/2004 | Luke et al. |
| 2004/0129181 | A1 | 7/2004 | Lalande et al. |
| 2004/0187740 | A1 | 9/2004 | Timmons |
| 2004/0188091 | A1 | 9/2004 | Luke et al. |
| 2004/0191439 | A1 | 9/2004 | Bour et al. |
| 2004/0211562 | A1 | 10/2004 | Brothers et al. |
| 2004/0211564 | A1 | 10/2004 | Brothers et al. |
| 2004/0244650 | A1 | 12/2004 | Brothers |
| 2004/0244977 | A1 | 12/2004 | Luke et al. |
| 2004/0256102 | A1 | 12/2004 | Trato |
| 2005/0000734 | A1 | 1/2005 | Getzlaf et al. |
| 2005/0034867 | A1 | 2/2005 | Griffith et al. |
| 2005/0056191 | A1 | 3/2005 | Brothers et al. |
| 2005/0072599 | A1 | 4/2005 | Luke et al. |
| 2005/0084334 | A1 | 4/2005 | Shi et al. |
| 2005/0098317 | A1 | 5/2005 | Reddy et al. |
| 2005/0133221 | A1 | 6/2005 | Chatterji et al. |
| 2006/0025312 | A1 | 2/2006 | Santra et al. |
| 2006/0054319 | A1 | 3/2006 | Fyten et al. |
| 2006/0162926 | A1 | 7/2006 | Roddy |
| 2006/0166834 | A1 | 7/2006 | Roddy |
| 2006/0260512 | A1 | 11/2006 | Nordmeyer |
| 2007/0056479 | A1 | 3/2007 | Gray |
| 2007/0137528 | A1 | 6/2007 | LeRoy-Delage et al. |
| 2007/0186820 | A1 | 8/2007 | O'Hearn |
| 2008/0156491 | A1 | 7/2008 | Roddy et al. |
| 2008/0229979 | A1 | 9/2008 | Lewis |
| 2009/0044726 | A1 | 2/2009 | Brouillette et al. |
| 2009/0071650 | A1 | 3/2009 | Roddy et al. |
| 2009/0105099 | A1 | 4/2009 | Warrender et al. |
| 2009/0114126 | A1 | 5/2009 | Roddy et al. |
| 2009/0120644 | A1 | 5/2009 | Roddy et al. |
| 2009/0124522 | A1 | 5/2009 | Roddy |
| 2009/0200009 | A1 | 8/2009 | Loehr |
| 2009/0312445 | A1 | 12/2009 | Roddy et al. |
| 2009/0320720 | A1 | 12/2009 | Roddy et al. |
| 2010/0041792 | A1 | 2/2010 | Roddy et al. |

FOREIGN PATENT DOCUMENTS

| | | |
|---|---|---|
| CA | 2153372 | 1/2006 |
| EP | 0814067 | 12/1997 |
| EP | 1092693 | 4/2001 |
| EP | 1236701 | 9/2002 |
| EP | 1394137 | 7/2003 |
| EP | 1348831 | 10/2003 |
| GB | 1469954 | 4/1997 |
| JP | 52117316 | 10/1977 |
| JP | 10110487 | 4/1998 |
| RU | 2026959 | 1/1995 |
| RU | 2262497 | 10/2005 |
| SU | 1373781 | 2/1988 |
| WO | WO 83/01443 | 4/1983 |
| WO | WO 98/54108 | 12/1998 |
| WO | WO 00/63134 | 1/2000 |
| WO | WO 03/031364 | 4/2003 |
| WO | WO2004/101951 | 11/2004 |
| WO | WO 2005/047212 | 5/2005 |
| WO | WO 2005/061846 | 7/2005 |
| WO | WO 2006/032841 | 3/2006 |
| WO | WO 2007/028952 | 3/2007 |
| WO | WO2009/138747 | 11/2009 |

OTHER PUBLICATIONS

U.S. Appl. No. 12/558,097, filed Sep. 11, 2009, Roddy.
U.S. Appl. No. 12/609,993, filed Oct. 30, 2009, Roddy.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder", 1999.
HES Brochure "HR-4 Cement Retarder", 1999.
HES Brochure "HR-5 Cement Additive", 1998.
HES Brochure "HR-7 Cement Retarder", 1999.
HES Brochure "Pozmix A Cement Additive", 1999.
HES Brochure "Pozmix Cement & Pozmix 140", pp. 1-37 (undated but admitted as prior art).
HES Brochure "The Story of Pozmix" (undated but admitted as prior art).
HES Brochure "Pozmix Cement and Pozmix 140 Information", pp. 1-52, Sep. 1957.
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.

"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 13 of 24 Chemical Abstracts on STN "Manufacture of ceramic particles from floatstone and fly ash", CN 1182062 (abstract only) (undated but admitted as prior art).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/257,261, Aug. 10, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/402,741, Oct. 24, 2007.
Office Action from U.S. Appl. No. 11/223,669, Jan. 29, 2008.
Office Action from U.S. Appl. No. 11/223,669, Apr. 8, 2008.
Foreign Search Report from PCT/GB2005/001415, Sep. 9, 2005.
Foreign Search Report from PCT/GB2006/000406, Jul. 5, 2006.
Foreign Search Report from PCT/GB2006/003163, Oct. 27, 2006.
Foreign Search Report from PCT/GB2006/003160, Nov. 2, 2006.
Foreign Search Report from PCT/GB2006/003735, Dec. 1, 2006.
Foreign Search Report from PCT/GB2006/003694, Dec. 19, 2006.
Foreign Search Report from PCT/GB2006/000401, May 8, 2007.
Office Action from U.S. Appl. No. 12/263,800, May 1, 2009.
Nelson, "Well Cementing", 1990.
"Fly Ash Resource Center-Pozzolan," available at http://www.rmajko.com/pozzolan.htm, Apr. 20, 2009.
Foreign Search Report from PCT/GB2009/000295, Feb. 3, 2009.
EPO Application No. 06794648.3 Examination Report, Apr. 17, 2009.
EPO Application No. 06779194.7 Examination Report, May 29, 2009.
Office Action from U.S. Appl. No. 12/283,398, Jul. 15, 2009.
Office Action from U.S. Appl. No. 12/263,800, Jul. 28, 2009.
Office Action from U.S. Appl. No. 12/420,630, Aug. 3, 2009.
USPTO Notice of Allowance for U.S. Appl. No. 12/420,630, Sep. 14, 2009.
Office Action from U.S. Appl. No. 12/349,676, Nov. 4, 2009.
English language translation of Foreign Office Action for Application No. RU2008113765 dated Jul. 6, 2009.
Foreign Office Action for Canadian Patent Application No. 2621835 dated Oct. 2, 2009.
Foreign Office Action for Canadian Patent Application No. 2621832 dated Oct. 5, 2009.
PCT International Search Report and Written Opinion for International Application No. PCT/GB2009/002598 dated Feb. 11, 2010.
PCT International Search Report and Written Opinion for International Application No. PCT/GB2009/002597 dated Feb. 1, 2010.
English language translation of USSR Patent No. RU 2026959, publication date Jan. 20, 1995.
Office Action for U.S. Appl. No. 12/609,993 dated Apr. 9, 2010.

* cited by examiner

METHODS OF CEMENTING IN SUBTERRANEAN FORMATIONS USING CEMENT KILN CEMENT KILN DUST IN COMPOSITIONS HAVING REDUCED PORTLAND CEMENT CONTENT

CROSS-REFERENCE TO RELATED APPLICATIONS

This application is a continuation in part of U.S. application Ser. No. 12/420,630, entitled "Cement Compositions Having Cement Kiln Dust and/or Pumicite and Methods of Use," filed on Apr. 8, 2009, which is a continuation in part of U.S. application Ser. No. 12/349,676, entitled "Extended Settable Compositions Comprising Cement Kiln Dust and Associated Methods," filed on Jan. 7, 2009, which is a divisional of U.S. application Ser. No. 12/034,886 entitled "Extended Settable Compositions Comprising Cement Kiln Dust and Associated Methods, filed on Feb. 21, 2008, which is a continuation in part of U.S. application Ser. No. 11/223,669 entitled "Settable Compositions Comprising Cement Kiln Dust and Additive(s)," filed Sep. 9, 2005, the entire disclosures of which are incorporated herein by reference.

BACKGROUND

The present invention relates to cementing operations and, more particularly, in certain embodiments, to methods of cementing in subterranean formations using cement kiln dust ("CKD") in compositions having reduced Portland cement content.

In cementing methods, such as well construction and remedial cementing, sealant compositions are commonly utilized. As used herein, the term "sealant composition" refers to a composition(s) that hydraulically sets or otherwise develops compressive strength suitable for use in subterranean applications. While a hydraulic composition is one type of sealant composition that may be used in cementing methods, other non-hydraulic sealant compositions also may be employed. By way of example, polymeric sealant compositions also may be used.

Sealant compositions may be used in primary cementing operations whereby pipe strings, such as casing and liners, are cemented in well bores. In performing primary cementing, a sealant composition may be pumped into an annulus between a subterranean formation and the pipe string disposed in the subterranean formation. The sealant composition should set in the annulus, thereby forming an annular sheath of hardened cement (e.g., a cement sheath) that supports and positions the pipe string in the well bore and bonds the exterior surface of the pipe string to the walls of the well bore.

Sealant compositions also may be used in remedial cementing operations, such as sealing voids in a pipe string or a cement sheath. As used herein the term "void" refers to any type of space, including fractures, holes, cracks, channels, spaces, and the like. Such voids may include: holes or cracks in the pipe strings; holes, cracks, spaces, or channels in the cement sheath; and very small spaces (commonly referred to as "microannuli") between the cement sheath and the exterior surface of the well casing or formation. Sealing such voids may prevent the undesired flow of fluids (e.g., oil, gas, water, etc.) and/or fine solids into, or from, the well bore. The sealing of such voids, whether or not made deliberately, has been attempted by introducing a sealant composition into the void and permitting it to remain therein to seal the void. If the substance does not fit into the void, a bridge, patch, or sheath may be formed over the void to possibly produce a termination of the undesired fluid flow. Hydraulic pressure may be employed to force the sealant composition into the void. Once placed into the void, the sealant composition may be permitted to harden.

Remedial cementing operations also may be used to seal portions of subterranean formations or portions of gravel packs. The portions of the subterranean formation may include permeable portions of a formation, fractures (natural or otherwise) in the formation, and other portions of the formation that may allow the undesired flow of fluid into, or from, the well bore. The portions of the gravel pack include those portions of the gravel pack, wherein it is desired to prevent the undesired flow of fluids into, or from, the well bore. A "gravel pack" is a term commonly used to refer to a volume of particulate materials (such as sand) placed into a well bore to at least partially reduce the migration of unconsolidated formation particulates into the well bore. While screenless gravel packing operations are becoming more common, gravel packing operations commonly involve placing a gravel pack screen in the well bore neighboring a desired portion of the subterranean formation and packing the surrounding annulus between the screen and the well bore with particulate materials that are sized to prevent and inhibit the passage of formation solids through the gravel pack with produced fluids. Among other things, this method may allow sealing of the portion of the gravel pack to prevent the undesired flow of fluids without requiring the gravel pack's removal.

Sealant compositions also may be used during the drilling of the well bore in a subterranean formation. For example, in the drilling of a well bore, it may be desirable, in some instances, to change the direction of the well bore. In some instances, sealant compositions may be used to facilitate this change of direction, for example, by drilling a pilot hole in a hardened mass of cement, commonly referred to as a "kickoff plug," placed in the well bore. Certain formations may cause the drill bit to drill in a particular direction. For example, in a vertical well, this may result in an undesirable well bore deviation from vertical. In a directional well (which is drilled at an angle from vertical), after drilling an initial portion of the well bore vertically, the direction induced by the formation may make following the desired path difficult. In those and other instances, special directional drilling tools may be used, such as a whipstock, a bent sub-downhole motorized drill combination, and the like. Generally, the directional drilling tool or tools used may be orientated so that a pilot hole is produced at the desired angle to the previous well bore in a desired direction. When the pilot hole has been drilled for a short distance, the special tool or tools are removed, if required, and drilling along the new path may be resumed. To help ensure that the subsequent drilling follows the pilot hole, it may be necessary to drill the pilot hole in a kickoff plug, placed in the well bore. In those instances, prior to drilling the pilot hole, a sealant composition may be introduced into the well bore and allowed to set to form a kickoff plug therein. The pilot hole then may be drilled in the kickoff plug, and the high strength of the kickoff plug helps ensure that the subsequent drilling proceeds in the direction of the pilot hole.

Sealant compositions (e.g., hydraulic compositions) used heretofore may comprise Portland cement. Portland cement generally is a major component of the cost for the sealant compositions. To reduce the cost of such sealant compositions, other components may be included in the sealant composition in addition to, or in place of, the Portland cement. Such components may include fly ash, slag cement, shale, metakaolin, zeolite, and the like. "Fly ash," as that term is used herein, refers to the residue from the combustion of powdered or ground coal, wherein the fly ash carried by the flue gases may be recovered, for example, by electrostatic precipitation. "Slag," as that term is used herein, refers to a granulated, blast furnace by-product formed in the production of cast iron and generally comprises the oxidized impurities found in iron ore. Slag cement generally comprises slag and a base, for example, such as sodium hydroxide, sodium bicarbonate, sodium carbonate, or lime, to produce a hydraulic composition that, when combined with water, may set to form a hardened mass.

During the manufacture of cement, a waste material commonly referred to as cement kiln dust ("CKD") is generated. CKD, as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to cementing operations and, more particularly, in certain embodiments, to methods of cementing in subterranean formations using CKD in compositions having reduced Portland cement content.

An embodiment of the present invention includes a method that comprises placing a sealant composition that comprises CKD and is essentially free of Portland cement in a subterranean formation; and allowing the sealant composition to set.

Another embodiment of the present invention includes a method that comprises placing a hydraulic sealant composition that comprises CKD and water and is essentially free of Portland cement in a subterranean formation; and allowing the hydraulic sealant composition to set.

Another embodiment of the present invention includes a method that comprises placing a hydraulic sealant composition in a subterranean formation, wherein the hydraulic sealant composition consists essentially of: pumicite, lime, CKD, water, and an additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, a gas, and any combination thereof, and allowing the hydraulic cement composition to set.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, in certain embodiments, to methods of cementing in subterranean formations using CKD in compositions having reduced Portland cement content. There may be several potential advantages to the methods and compositions of the present invention, only some of which may be alluded to herein. One of the many potential advantages of the methods and compositions of the present invention is that the inclusion of the CKD and/or natural pozzolan in the sealant composition may reduce the amount of, or potentially eliminate, a higher cost additive, such as Portland cement, resulting in a more economical sealant composition.

Embodiments of the sealant compositions of the present invention may comprise CKD and be essentially free of Portland cement. While a variety of different sealant compositions capable of gaining sufficient compressive strength for use in subterranean applications may be suitable for use, one example of a particularly suitable sealant composition is a hydraulic composition. By way of example, a suitable sealant composition is a hydraulic composition that may comprise CKD, a natural pozzolan (e.g., pumicite), lime, and water and also be essentially free of a Portland cement. Other optional additives may also be included in embodiments of the sealant compositions of the present invention as desired, including, but not limited to, fly ash, slag cement, metakaolin, shale, zeolite, combinations thereof, and the like. As described in more detail herein, embodiments of the sealant compositions of the present invention may be foamed and/or extended as desired by those of ordinary skill in the art.

The sealant compositions of the present invention should have a density suitable for a particular application as desired by those of ordinary skill in the art, with the benefit of this disclosure. In some embodiments, the sealant compositions of the present invention may have a density in the range of about 8 pounds per gallon ("ppg") to about 16 ppg. In the foamed embodiments, the foamed sealant compositions of the present invention may have a density in the range of about 8 ppg to about 13 ppg.

It should be understood that the sealant compositions may be essentially free of Portland cement in accordance with embodiments of the present invention. As used herein, the term "essentially free" means less than about 1% by weight of cementitious components. Cementitious components include those components or combinations of components of the sealant compositions that hydraulically set, or otherwise harden, to develop compressive strength, including, for example, CKD, fly ash, natural pozzolans (e.g., pumicite), slag, lime, resins, shale, and the like. In certain embodiments, the sealant composition may contain Portland cement in an amount less than about 0.1% by weight of cementitious components and, alternatively, less than about 0.01% by weight of cementitious components. By way of example, the sealant composition, in certain embodiments, may be free of Portland cement, in that the sealant composition contains no Portland cement. In certain embodiments, the sealant compositions may be essentially free of Portland cements classified as Classes A, C, G, and H cements according to American Petroleum Institute, API Specification for Materials and Testing for Well Cements, API Specification 10, Fifth Ed., Jul. 1, 1990. By way of further example, the sealant compositions may be essentially free of Portland cements classified as ASTM Type I, II, or III.

Embodiments of the sealant compositions generally may comprise CKD. The CKD generally may exhibit cementitious properties, in that it may set and harden in the presence of water. The CKD may be used, among other things, to replace higher cost cementitious components, such as Portland cement, in embodiments of the sealant compositions, resulting in more economical sealant compositions. The CKD may be included in the sealant compositions in an amount sufficient to provide the desired compressive strength, density, and/or cost reduction. In some embodiments, the CKD may be present in the sealant compositions of the present invention in an amount in the range of about 1% to about 99% by weight of cementitious components. In some embodiments, the CKD may be present in the sealant compositions of the present invention in an amount in the range of about 5% to about 99% by weight of cementitious components. In some embodiments, the CKD may be present in an amount in the range of about 5% to about 80% by weight of cementitious components. In some embodiments, the CKD may be present in an amount in the range of about 10% to about 50% by weight of cementitious components. One of ordinary skill in the art, with the benefit of this disclosure, will recognize the appropriate amount of CKD to include for a chosen application.

Embodiments of the sealant compositions further may comprise a natural pozzolan. Natural pozzolans are generally present on the Earth's surface and set and harden in the presence of hydrated lime and water. Examples of natural pozzolans include pumicite, diatomaceous earth, volcanic ash, opaline shale, tuff, and combinations thereof. Generally, pumicite is a volcanic rock that exhibits cementitious properties, in that it may set and harden in the presence of hydrated lime and water. Hydrated lime may be used in combination with the pumicite, for example, to provide sufficient calcium ions for pumicite to set. The natural pozzolan may be used, among other things, to replace higher cost cementitious components, such as Portland cement, in embodiments of the sealant compositions, resulting in more economical sealant compositions. Where present, the natural pozzolan may be included in an amount in the range of from about 0.1% to about 50% by weight of cementitious components, for example. In some embodiments, the natural pozzolan may be present in an amount in the range of from about 25% to about 50% by weight of cementitious components. One of ordinary skill in the art, with the benefit of this disclosure, will recognize the appropriate amount of the natural pozzolan to include for a chosen application.

Embodiments of the sealant compositions further may comprise lime. In certain embodiments, the lime may be hydrated lime. The lime may be included in embodiments of the sealant compositions, for example to, form a hydraulic composition with other components of the sealant compositions, such as the pumicite, fly ash, slag, and/or shale. Where present, the lime may be included in the sealant compositions in an amount in the range of from about 1% to about 40% by weight of cementitious components, for example. In some embodiments, the lime may be present in an amount in the range of from about 5% to about 20% by weight of cementitious components. One of ordinary skill in the art, with the benefit of this disclosure, will recognize the appropriate amount of the lime to include for a chosen application.

In an embodiment, sealant compositions of the present invention may comprise a natural pozzolan (e.g., pumicite) and CKD in a weight ratio of from about 1/99 to about 99/1 with lime present in an amount of about 5% to about 15% by the combined weight of the natural pozzolan and the CKD. In another embodiment, sealant compositions of the present invention may comprise a natural pozzolan (e.g., pumicite) and CKD in a weight ratio of from about 65/35 to about 80/20 with lime present in an amount of about 5% to about 15% by the combined weight of the natural pozzolan and the CKD. In general, it should be understood that as the amount of the CKD is decreased the amount of the natural pozzolan may be increased, in accordance with embodiments of the present invention.

Embodiments of the sealant compositions further may comprise fly ash. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it should set to form a hardened mass. Class F fly ash generally does not contain sufficient lime, so an additional source of calcium ions is required for the Class F fly ash to form a hydraulic composition. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, commercially available from Halliburton Energy Services, Inc., Duncan, Okla.

Where present, the fly ash generally may be included in the sealant compositions in an amount sufficient to provide the desired compressive strength, density, and/or cost. In some embodiments, the fly ash may be present in the sealant compositions of the present invention in an amount in the range of about 5% to about 75% by weight of cementitious components. In some embodiments, the fly ash may be present in an amount in the range of about 10% to about 60% by weight of cementitious components. One of ordinary skill in the art, with the benefit of this disclosure, will recognize the appropriate amount of the fly ash to include for a chosen application.

Embodiments of the sealant compositions further may comprise a slag cement. In some embodiments, a slag cement that may be suitable for use may comprise slag. Slag generally does not contain sufficient basic material, so slag cement further may comprise a base to produce a hydraulic composition that may react with water to set to form a hardened mass. Examples of suitable sources of bases include, but are not limited to, sodium hydroxide, sodium bicarbonate, sodium carbonate, lime, and combinations thereof.

Where present, the slag cement generally may be included in the sealant compositions in an amount sufficient to provide the desired compressive strength, density, and/or cost. In some embodiments, the slag cement may be present in the sealant compositions of the present invention in an amount in the range of about 0.1% to about 99% by weight of cementitious components. In some embodiments, the slag cement may be present in an amount in the range of about 5% to about 75% by weight of cementitious components. One of ordinary skill in the art, with the benefit of this disclosure, will recognize the appropriate amount of the slag cement to include for a chosen application.

Embodiments of the sealant compositions further may comprise metakaolin. Generally, metakaolin is a white pozzolan that may be prepared by heating kaolin clay, for example, to temperatures in the range of about 600° C. to about 800° C. In some embodiments, the metakaolin may be present in the sealant compositions of the present invention in an amount in the range of about 5% to about 95% by weight of cementitious components. In some embodiments, the metakaolin may be present in an amount in the range of about 10% to about 50% by weight of cementitious components. One of ordinary skill in the art, with the benefit of this disclosure, will recognize the appropriate amount of the metakaolin to include for a chosen application.

Embodiments of the sealant compositions further may comprise shale. Among other things, shale included in the sealant compositions may react with excess lime to form a suitable cementing material, for example, calcium silicate hydrate. A variety of shales may be suitable, including those comprising silicon, aluminum, calcium, and/or magnesium. An example of a suitable shale comprises vitrified shale. Suitable examples of vitrified shale include, but are not limited to, PRESSUR-SEAL FINE LCM material and PRESSUR-SEAL COARSE LCM material, which are commercially available from TXI Energy Services, Inc., Houston, Tex. Generally, the shale may have any particle size distribution as desired for a particular application. In certain embodiments, the shale may have a particle size distribution in the range of about 37 micrometers to about 4,750 micrometers.

Where present, the shale may be included in the sealant compositions of the present invention in an amount sufficient to provide the desired compressive strength, density, and/or cost. In some embodiments, the shale may be present in the sealant compositions of the present invention in an amount in the range of about 5% to about 75% by weight of cementitious components. In some embodiments, the shale may be present in an amount in the range of about 10% to about 35% by weight of cementitious components. One of ordinary skill in the art, with the benefit of this disclosure, will recognize the appropriate amount of the shale to include for a chosen application.

Embodiments of the sealant compositions further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of suitable zeolites are described in more detail in U.S. Patent Publication No. 2007/10056475 A1. An example of a suitable source of zeolite is available from the C2C Zeolite Corporation of Calgary, Canada. In some embodiments, the zeolite may be present in the sealant compositions of the present invention in an amount in the range of about 5% to about 65% by weight of cementitious components. In certain embodiments, the zeolite may be present in an amount in the range of about 10% to about 40% by weight of cementitious components. One of ordinary skill in the art, with the benefit of this disclosure, will recognize the appropriate amount of the zeolite to include for a chosen application.

Embodiments of the sealant compositions further may comprise a set retarding additive. As used herein, the term "set retarding additive" refers to an additive that retards the setting of the sealant compositions of the present invention. Examples of suitable set retarding additives include, but are not limited to, ammonium, alkali metals, alkaline earth metals, metal salts of sulfoalkylated lignins, organic acids (e.g., hydroxycarboxy acids), copolymers that comprise acrylic acid or maleic acid, and combinations thereof. One example of a suitable sulfoalkylate lignin comprises a sulfomethylated lignin. Suitable set retarding additives are disclosed in more detail in U.S. Pat. No. Re. 31,190, the entire disclosure of which is incorporated herein by reference. Suitable set retarding additives are commercially available from Halliburton Energy Services, Inc. under the trademarks HR® 4, HR® 5, HR® 7, HR® 12, HR® 15, HR® 25, HR® 601, SCR™ 100, and SCR™ 500 retarders. Generally, where used, the set retarding additive may be included in the sealant compositions of the present invention in an amount sufficient to provide the desired set retardation. In some embodiments, the set retarding additive may be present in the sealant compositions of the present invention an amount in the range of about 0.1% to about 5% by weight of cementitious components. One of ordinary skill in the art, with the benefit of this disclosure, will recognize the appropriate amount of the set retarding additive to include for a chosen application.

Embodiments of the sealant compositions further may comprise water. The water used in embodiments of the sealant compositions may include, for example, freshwater, saltwater (e.g., water containing one or more salts dissolved therein), brine (e.g., saturated saltwater produced from subterranean formations), seawater, or combinations thereof. Generally, the water may be from any source, provided that the water does not contain an excess of compounds that may undesirably affect other components in the sealant composition. In some embodiments, the water may be included in an amount sufficient to form a pumpable slurry. In some embodiments, the water may be included in the sealant compositions of the present invention in an amount in the range of about 40% to about 200% by weight of dry components. In some embodiments, the water may be included in an amount in the range of about 40% to about 150% by weight of dry components. One of ordinary skill in the art, with the benefit of this disclosure, will recognize the appropriate amount of water to include for a chosen application.

Optionally, other additional additives may be added to the sealant compositions of the present invention as deemed appropriate by one skilled in the art, with the benefit of this disclosure. Examples of such additives include, but are not limited to, strength-retrogression additives, set accelerators, weighting agents, lightweight additives, gas-generating additives, mechanical property enhancing additives, lost-circulation materials, filtration-control additives, dispersants, fluid loss control additives, defoaming agents, foaming agents, oil-swellable particles, water-swellable particles, thixotropic additives, and combinations thereof. Specific examples of these, and other, additives include crystalline silica, amorphous silica, fumed silica, salts, fibers, hydratable clays, microspheres, rice husk ash, elastomers, elastomeric particles, resins, latex, combinations thereof, and the like. A person having ordinary skill in the art, with the benefit of this disclosure, will readily be able to determine the type and amount of additive useful for a particular application and desired result.

As mentioned above, the sealant compositions of the present invention may be foamed, for example, further comprising a gas and a surfactant, in accordance with embodiments of the present invention. A foamed sealant composition may be used, for example, where it is desired for the sealant composition to be lightweight. For example, a foamed sealant composition of the present invention may comprise CKD, a gas, a surfactant and water and be essentially free of Portland cement. By way of further example, a foamed sealant composition of the present invention may comprise CKD, a natural pozzolan, lime, a gas, a surfactant, and water and be essentially free of Portland cement. Other suitable additives, such as those discussed previously, also may be included in the foamed sealant compositions of the present invention as desired by those of ordinary skill in the art, with the benefit of this disclosure.

The gas used in the foamed sealant compositions of the present invention may be any gas suitable for foaming a sealant composition, including, but not limited to, air, nitrogen, or combinations thereof. Generally, the gas should be present in the foamed sealant compositions of the present invention in an amount sufficient to form the desired foam. In certain embodiments, the gas may be present in a foamed sealant composition of the present invention in an amount in the range of about 10% to about 80% by volume of the composition. One of ordinary skill in the art, with the benefit of this disclosure, will recognize the appropriate amount of gas to include for a chosen application.

Where foamed, embodiments of the sealant compositions of the present invention further comprise a surfactant. In some embodiments, the surfactant comprises a foaming and stabilizing surfactant composition. As used herein, a "foaming and stabilizing surfactant composition" refers to a composition that comprises one or more surfactants and, among other things, may be used to facilitate the foaming of a sealant composition and also may stabilize the resultant foamed sealant composition formed therewith. Any suitable foaming and stabilizing surfactant composition may be used in the sealant compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is ZONESEAL® 2000 foaming additive, commercially available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference.

Generally, the surfactant may be present in the foamed sealant compositions of the present invention in an amount sufficient to provide a suitable foam. In some embodiments, the surfactant may be present in the foamed sealant compositions of the present invention an amount in the range of about 0.8% and about 5% by volume of the water ("bvow"). One of ordinary skill in the art, with the benefit of this disclosure, will recognize the appropriate amount of the surfactant to include for a chosen application.

As mentioned above, the sealant compositions may be extended in accordance with embodiments of the present invention, in that the present invention provides extended sealant compositions that are capable of remaining in a pumpable fluid state for an extended period of time. For example, the extended sealant compositions may be capable of remaining in a pumpable fluid state for at least about 1 day or longer (e.g., at least about 5 days). When desired for use, the extended sealant composition may be activated (e.g., by addition of a cement set accelerator) to thereby set into a hardened mass. By way of example, the extended sealant composition, after activation, may set to a compressive strength (as determined using the procedure set forth in API Recommended Practice 10B) at 140° F. of at least 100 psi in 72 hours, alternatively at least 500 psi. Among other things, the extended sealant compositions of the present invention may be suitable for use in well bore applications, for example, where it is desired to prepare the cement composition in advance. By way of example, the extended sealant compositions may facilitate preparation of the sealant composition at a convenient location and then transport to the job site for use in the cementing operation.

An example of a suitable extended sealant composition of the present invention comprises CKD, a set retarding additive, and water and is essentially free of Portland cement. By way of further example, a suitable extended composition comprises CKD, a natural pozzolan, lime, a set retarding additive, and water and is essentially free of Portland cement. Optionally, a suspending agent may be included in the extended sealant composition as desired. Other suitable additives, such as those discussed previously, also may be included in the extended sealant compositions of the present invention as desired by those of ordinary skill in the art, with the benefit of this disclosure.

Set retarding additives are included in the extended sealant compositions of the present invention, in accordance with embodiments of the present invention. Examples of suitable set retarding additives for extending the sealant compositions include, but are not limited to, organic acids, lignosulfonates, synthetic retarders and combinations thereof. It has been discovered that certain set retarding additives, such as phosphonated compounds, may not be desirable in certain applications because the sealant composition may become over retarded such that the composition does not activate and develop reasonable compressive strength. Examples of organic acids that may be included in the extended sealant compositions of the present invention include, but are not limited to, tartaric acid, gluconic acid, carboxylic acids (e.g., citric acid), hydroxy carboxy acids, and combinations thereof. One example of a suitable tartaric acid is HR®-25 cement retarder available from Halliburton Energy Services, Inc. Examples of lignosulfonates that may be included in the extended sealant compositions of the present invention include, but are not limited to, a sulfomethylated lignin, calcium lignosulfonates, sodium lignosulfonates, and combinations thereof. Examples of suitable lignosulfonates include HR®-4, HR®-5, and HR®-7 cement retarders available from Halliburton Energy Services, Inc. Examples of synthetic retarders that may be included in the extended sealant compositions of the present invention include, but are not limited to, copolymers of acrylic acid and acrylamido-methylpropane sulfonate polymer and copolymers of maleic anhydride and acrylamido-methyl-propane sulfonate polymer. Examples of suitable synthetic retarders include SCR™-100 and SCR™-500 cement retarders available from Halliburton Energy Services, Inc. Examples of suitable synthetic retarders are described in U.S. Pat. Nos. 4,941,536, 5,049,288, 5,472,051, and 5,536,311, the disclosures of which are incorporated herein by reference.

The set retarding additive should be included in the extended sealant compositions of the present invention in an amount sufficient for the sealant composition to remain in a pumpable fluid state for an extended period of time (e.g., at least about 1 day). In certain embodiments, the set retarding additive may be included in the extended sealant compositions of the present invention in an amount in the range of about 0.1% to about 5% by weight of cementitious components. In certain embodiments, the set retarding additive may be included in an amount in the range of about 0.1% to about 1.5% by weight of cementitious components. Where the set retarding additive comprises tartaric acid, the tartaric acid may be included, for example, in the extended sealant composition in an amount in the range of about 0.2% to about 0.35% by weight of cementitious components, for example. Where the set retarding additive comprises a sulfomethylated lignin, the sulfomethylated lignin may be included, for example, in the extended sealant composition in an amount in the range of about 0.2% to about 1% by weight of cementitious components. Those of ordinary skill in the art, with the benefit of this disclosure, should be able to determine an appropriate set retarding additive and amount thereof for a particular application.

As previously mentioned, at a desired time for use, the extended sealant composition may be activated, for example, by addition of a cement set accelerator. Examples of suitable cement set accelerators include, but are not limited to, calcium chloride, triethanolamine, sodium silicate, zinc formate, calcium acetate, and combinations thereof. An example of a suitable sodium silicate is ECONOLITE™ additive, available from Halliburton Energy Services, Inc. The cement set accelerator should be added to the extended sealant composition in an amount sufficient to activate the extended sealant composition to set into a hardened mass. In certain embodiments, the cement set accelerator may be added to the extended sealant compositions of the present invention in an amount in the range of about 0.1% to about 4% by weight of cementitious components. One of ordinary skill in the art, with the benefit of this disclosure, will recognize the appropriate amount of the cement set accelerator to include for a chosen application.

As will be appreciated by those of ordinary skill in the art, embodiments of the sealant compositions of the present invention may be used for forming a seal in a variety of subterranean applications. By way of example, embodiments of the sealant compositions may be used in cementing methods, including primary and remedial cementing.

An example of a method of the present invention comprises placing a sealant composition in a subterranean formation, and allowing the sealant composition to set. In some embodiments, the sealant compositions of the present invention may be foamed. As desired by one of ordinary skill in the art, with the benefit of this disclosure, the sealant compositions of the present invention useful in this method may comprise any of the above-listed additives, as well any of a variety of other additives suitable for use in subterranean applications.

Another example of a method of the present invention includes a method of cementing a conduit (e.g., pipe string, casing, expandable casing, liners, etc.) disposed in a well bore. An example of such a method may comprise placing a sealant composition into the annulus between the conduit and the subterranean formation, allowing the sealant composition to set in the annulus. Generally, in most instances, the sealant composition should fix the conduit in the well bore. In some embodiments, the sealant compositions of the present invention may be foamed or extended. As desired by one of ordinary skill in the art, with the benefit of this disclosure, the sealant compositions of the present invention useful in this method may comprise any of the above-listed additives, as well any of a variety of other additives suitable for use in subterranean application.

Another example of a method of the present invention includes a method of sealing a portion of a gravel pack or a portion of a subterranean formation. An example of such a method may comprise placing a sealant composition into the portion of the gravel pack or the portion of the subterranean formation, and allowing the sealant composition to set. The portions of the subterranean formation may include, for example, permeable portions of the formation and fractures (natural or otherwise) in the formation and other portions of the formation that may allow the undesired flow of fluid into, or from, the well bore. The portions of the gravel pack may include, for example, those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal. In some embodiments, the sealant compositions of the present invention may be foamed or extended. As desired by one of ordinary skill in the art, with the benefit of this disclosure, the sealant compositions of the present invention useful in this method may comprise any of the above-listed additives, as well any of a variety of other additives suitable for use in subterranean applications.

Another example of a method of the present invention includes a method of sealing voids located in a conduit (e.g., pipe string, casing, expandable casings, liners, etc.) or in a cement sheath. Generally, the conduit will be disposed in a well bore, and the cement sheath may be located in the annulus between the conduit disposed in the well bore and the subterranean formation. An example of such a method may comprise placing the sealant composition into the void, and allowing the sealant composition to set in the void. In some embodiments, the sealant compositions of the present invention may be foamed or extended. As desired by one of ordinary skill in the art, with the benefit of this disclosure, the sealant compositions of the present invention useful in this method may comprise any of the above-listed additives, as well any of a variety of other additives suitable for use in subterranean applications.

When sealing a void in a conduit, methods of the present invention, in some embodiments, further may comprise locating the void in the conduit, and isolating the void by defining a space within the conduit in communication with the void; wherein the sealant composition may be introduced into the void from the space. The void may be isolated using any suitable technique and/or apparatus, including bridge plugs, packers, and the like. The void in the conduit may be located using any suitable technique. When sealing a void in the cement sheath, the methods of the present invention, in some embodiments, further may comprise locating the void in the cement sheath, producing a perforation in the conduit that intersects the void, and isolating the void by defining a space within the conduit in communication with the void via the perforation, wherein the sealant composition is introduced into the void via the perforation. The void in the cement sheath may be located using any suitable technique. The perforation may be created in the conduit using any suitable technique, for example, perforating guns. The void may be isolated using any suitable technique and/or apparatus, including bridge plugs, packers, and the like.

To facilitate a better understanding of the present invention, the following examples of certain aspects of some embodiments are given. In no way should the following examples be read to limit, or define, the scope of the invention.

EXAMPLE 1

A series of sample sealant compositions were prepared at room temperature and subjected to 48-hour compressive strength tests at 140° F. in accordance with API Specification 10. The sample compositions comprised water, Class A CKD, and Class A Portland cement.

The results of the compressive strength tests are set forth in the table below. In this table, percent by weight is based on the weight of the Portland cement and the CKD in the samples.

TABLE 1

Unfoamed Compressive Strength Tests:
Class A Cement and Class A CKD

| Sample | Density (ppg) | Portland Cement Class A (% by wt) | CKD Class A (% by wt) | 48-Hour Compressive Strength at 140° F. (psi) |
|---|---|---|---|---|
| 1 | 14 | 0 | 100 | 228 |
| 2 | 15.15 | 25 | 75 | 701 |
| 3 | 14.84 | 50 | 50 | 1,189 |
| 4 | 15.62 | 75 | 25 | 3,360 |
| 5 | 15.6 | 100 | 0 | 2,350 |

EXAMPLE 2

Additional sample sealant compositions were prepared at room temperature and subjected to thickening time and fluid loss tests at 140° F. and 240° F., respectively, in accordance with API Specification 10.

Sample 6 comprised water, Class A Portland Cement (50% by weight), Class A CKD (50% by weight), HALAD® 23 fluid loss control additive (0.75% by weight), and HR®-5 set retarder (0.25% by weight). In this Example, the percent by weight is based on the amount of the Portland cement and the CKD in the samples. Accordingly, Sample 6 had a Portland cement-to-CKD weight ratio of about 50:50. This Sample had a density of 14.84 ppg. HALAD® 23 additive is a cellulose-based fluid loss control additive that is commercially available from Halliburton Energy Services, Inc., Duncan, Okla. HR®-5 retarder is a lignosulfonate set retarder that is commercially available from Halliburton Energy Services, Inc., Duncan, Okla.

Sample 7 comprised water, Class A Portland Cement (50% by weight), Class A CKD (50% by weight), HALAD® 413 fluid loss control additive (0.75% by weight), and HR®-12 set retarder (0.3% by weight). Accordingly, Sample 7 had a Portland cement-to-CKD weight ratio of 50:50. This Sample had a density of 14.84 ppg. HALAD® 413 additive is a grafted copolymer fluid loss control additive that is commercially available from Halliburton Energy Services, Inc., Duncan, Okla. HR®-12 retarder is a mixture of a lignosulfonate and hydroxycarboxy acid set retarder that is commercially available from Halliburton Energy Services, Inc., Duncan, Okla.

The results of the fluid loss and thickening time tests are set forth in the table below.

TABLE 2

Unfoamed Thickening Time and Fluid Loss Tests:
Class A Cement and Class A CKD

| Sample | Cement-to-CKD Weight Ratio | Test Temperature (° F.) | Thickening Time to 70 BC (hr:min) | API Fluid Loss in 30 min (ml) |
|---|---|---|---|---|
| 6 | 50:50 | 140 | 6:06 | 147 |
| 7 | 50:50 | 240 | 2:20 | 220 |

EXAMPLE 3

A series of sample sealant compositions were prepared at room temperature and subjected to 48-hour compressive strength tests at 140° F. in accordance with API Specification 10. The sample compositions comprised water, Class H CKD, and Class H Portland cement.

The results of the compressive strength tests are set forth in the table below. In this table, percent by weight is based on the weight of the Portland cement and the CKD in the samples.

TABLE 3

Unfoamed Compressive Strength Tests:
Class H Cement and Class H CKD

| Sample | Density (ppg) | Portland Cement Class H (% by wt) | CKD Class H (% by wt) | 48-Hour Compressive Strength at 140° F. (psi) |
|---|---|---|---|---|
| 8 | 15.23 | 0 | 100 | 74.9 |
| 9 | 15.4 | 25 | 75 | 544 |
| 10 | 16 | 50 | 50 | 1,745 |
| 11 | 16.4 | 75 | 25 | 3,250 |
| 12 | 16.4 | 100 | 0 | 1,931 |

EXAMPLE 4

Additional sample sealant compositions were prepared at room temperature and subjected to thickening time and fluid loss tests at 140° F. and 240° F., respectively, in accordance with API Specification 10.

Sample 13 comprised water, Class H Portland Cement (50% by weight), Class H CKD (50% by weight), HALAD® 23 fluid loss control additive (0.75% by weight), and 0.25% by weight HR®-5 set retarder (0.25% by weight). In this Example, percent by weight is based on the weight of the Portland cement and the CKD in the samples. Accordingly, Sample 13 had a Portland cement-to-CKD weight ratio of about 50:50. This Sample had a density of 16 ppg.

Sample 14 comprised water, Class H Portland Cement (50% by weight), Class H CKD (50% by weight), HALAD® 413 fluid loss control additive (0.75% by weight), and HR®-12 set retarder (0.3% by weight). Accordingly, Sample 14 had a Portland cement-to-CKD weight ratio of about 50:50. This Sample had a density of 16 ppg.

The results of the fluid loss and thickening time tests are set forth in the table below.

TABLE 4

Unfoamed Thickening Time and Fluid Loss Tests:
Class H Cement and Class H CKD

| Sample | Cement-to-CKD Weight Ratio | Test Temperature (° F.) | Thickening Time to 70 BC (hr:min) | API Fluid Loss in 30 min (ml) |
|---|---|---|---|---|
| 13 | 50:50 | 140 | 5:04 | 58 |
| 14 | 50:50 | 240 | 1:09 | 220 |

EXAMPLE 5

A series of sample sealant compositions were prepared at room temperature and subjected to 48-hour compressive strength tests at 140° F. in accordance with API Specification 10. The sample compositions comprised water, Class G CKD, and Class G Portland cement.

The results of the compressive strength tests are set forth in the table below. In this table, percent by weight is based on the weight of the Portland cement and the CKD in the samples.

TABLE 5

Unfoamed Compressive Strength Tests:
Class G Cement and Class G CKD

| Sample | Density (ppg) | Portland Cement Class G (% by wt) | CKD Class G (% by wt) | 48-Hour Compressive Strength at 140° F. (psi) |
|---|---|---|---|---|
| 15 | 14.46 | 0 | 100 | 371 |
| 16 | 14.47 | 25 | 75 | 601 |
| 17 | 14.49 | 50 | 50 | 1,100 |
| 18 | 14.46 | 75 | 25 | 3,160 |
| 19 | 14.46 | 100 | 0 | 3,880 |

EXAMPLE 6

A series of sample sealant compositions were prepared at room temperature and subjected to thickening time and fluid loss tests at 140° F. and 240° F., respectively, in accordance with API Specification 10.

Sample 20 comprised water, Class G Portland Cement (50% by weight), Class G CKD (50% by weight), HALAD® 23 fluid loss control additive (0.75% by weight), and HR®-5 set retarder (0.25% by weight). In this Example, percent by weight is based on the weight of the Portland cement and the CKD in the samples. Accordingly, Sample 20 had a Portland cement-to-CKD weight ratio of about 50:50. This Sample had a density of 15.23 ppg.

Sample 21 comprised water, Class G Portland Cement (50% by weight), Class G CKD (50% by weight), HALAD® 413 fluid loss control additive (0.75% by weight), and HR®-12 set retarder (0.3% by weight). Accordingly, Sample 21 had a Portland cement-to-CKD weight ratio of about 50:50. This Sample had a density of 15.23 ppg.

The results of the fluid loss and thickening time tests are set forth in the table below.

TABLE 6

Unfoamed Thickening Time and Fluid Loss Tests:
Class G Cement and Class G CKD

| Sample | Cement-to-CKD Weight Ratio | Test Temperature (° F.) | Thickening Time to 70 BC (hr:min) | API Fluid Loss in 30 min (ml) |
|---|---|---|---|---|
| 20 | 50:50 | 140 | 3:19 | 132 |
| 21 | 50:50 | 240 | 1:24 | 152 |

Accordingly, Examples 1-6 indicate that sealant compositions comprising Portland cement and CKD may have suitable thickening times, compressive strengths, and/or fluid loss properties for a particular application.

EXAMPLE 7

A series of foamed sample sealant compositions were prepared in accordance with the following procedure. For each sample, a base sample composition was prepared that comprised water, Class A Portland cement, and Class A CKD. The amounts of CKD and Portland cement were varied as shown in the table below. ZONESEAL® 2000 foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below. In this table, percent by weight is based on the weight of the Portland cement and the CKD in the samples.

TABLE 7

Foamed Compressive Strength Test:
Class A Cement and Class A CKD

| Sample | Base Density (ppg) | Foam Density (ppg) | Portland Cement Class A (% by wt) | CKD Class A (% by wt) | 72-Hour Compressive Strength at 140° F. (psi) |
|---|---|---|---|---|---|
| 22 | 14.34 | 12 | 0 | 100 | 167.6 |
| 23 | 14.15 | 12 | 25 | 75 | 701 |
| 24 | 15.03 | 12 | 50 | 50 | 1,253 |
| 25 | 15.62 | 12 | 75 | 25 | 1,322 |
| 26 | 15.65 | 12 | 100 | 0 | 1,814 |

EXAMPLE 8

A series of foamed sample sealant compositions were prepared in accordance with the following procedure. For each sample, a base sample composition was prepared that comprised water, Class H Portland cement, and Class H CKD.

The amounts of CKD and Portland cement were varied as shown in the table below. ZONESEAL® 2000 foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below. In this table, percent by weight is based on the weight of the Portland cement and the CKD in the samples.

TABLE 8

Foamed Compressive Strength Tests:
Class H Cement and Class H CKD

| Sample | Base Density (ppg) | Foam Density (ppg) | Portland Cement Class H (% by wt) | CKD Class H (% by wt) | 72-Hour Compressive Strength at 140° F. (psi) |
|---|---|---|---|---|---|
| 27 | 15.07 | 12 | 0 | 100 | 27.2 |
| 28 | 15.4 | 12 | 25 | 75 | 285 |
| 29 | 16 | 12 | 50 | 50 | 845 |
| 30 | 16.4 | 12 | 75 | 25 | 1,458 |
| 31 | 16.57 | 12 | 100 | 0 | 1,509 |

EXAMPLE 9

A series of foamed sample sealant compositions were prepared in accordance with the following procedure. For each sample, a base sample composition was prepared that comprised water, Class G Portland cement, and Class G CKD. The amounts of CKD and Portland cement were varied as shown in the table below. ZONESEAL® 2000 foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below. In this table, percent by weight is based on the weight of the Portland cement and the CKD in the samples.

TABLE 9

Foamed Compressive Strength Tests:
Class G Cement and Class G CKD

| Sample | Base Density (ppg) | Foam Density (ppg) | Portland Cement Class G (% by wt) | CKD Class G (% by wt) | 72-Hour Compressive Strength at 140° F. (psi) |
|---|---|---|---|---|---|
| 32 | 14.32 | 12 | 0 | 100 | 181 |
| 33 | 14.61 | 12 | 25 | 75 | 462 |
| 34 | 15 | 12 | 50 | 50 | 729 |
| 35 | 15.43 | 12 | 75 | 25 | 1,196 |
| 36 | 15.91 | 12 | 100 | 0 | 1,598 |

Accordingly, Examples 7-9 indicate that foamed sealant compositions comprising Portland cement and CKD may have suitable compressive strengths for a particular application.

EXAMPLE 10

A series of sample sealant compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below. In this table, percent by weight is based on the weight of the Portland cement, CKD, shale, fly ash, and/or lime in the samples.

TABLE 10

Unfoamed Compressive Strength Tests
Class A Cement, Class A CKD, Shale, Fly Ash, and/or Lime

| Sample | Portland Cement Class A (% by wt) | CKD Class A (% by wt) | Vitrified Shale[1] (% by wt) | POZMIX® A Additive (% by wt) | Hydrated Lime (% by wt) | 24-Hour Compressive Strength at 140° F. (psi) |
|---|---|---|---|---|---|---|
| 37 | 26 | 0 | 0 | 61 | 13 | 1,024 |
| 38 | 19.5 | 6.5 | 0 | 61 | 13 | 766 |
| 39 | 20.7 | 5.3 | 0 | 61 | 13 | 825 |
| 40 | 23.3 | 2.7 | 0 | 61 | 13 | 796 |
| 41 | 19.4 | 3.3 | 3.3 | 61 | 13 | 717 |
| 42 | 20.7 | 2.65 | 2.65 | 61 | 13 | 708 |
| 43 | 23.3 | 1.35 | 1.35 | 61 | 13 | 404 |

[1] The vitrified shale used was "PRESSUR-SEAL® FINE LCM" material.

EXAMPLE 11

A series of sample sealant compositions were prepared and subjected to thickening time tests at 140° F. in accordance with API Specification 10.

Sample 44 comprised water, Class A Portland Cement (26% by weight), POZMIX® A cement additive (61% by weight), hydrated lime (13% by weight), HALAD® 23 fluid loss control additive (0.6% by weight), and HR®-5 set retarder (0.1% by weight). In this Example, percent by weight is based on the weight of the Portland cement, CKD, shale, fly ash, and/or lime in the samples. This Sample had a density of 14.2 ppg.

Sample 45 comprised water, Class A Portland Cement (19.5% by weight), Class A CKD (6.5% by weight), POZMIX® A cement additive (61% by weight), hydrated lime (13% by weight), HALAD® 23 fluid loss control additive (0.6% by weight), and HR®-5 set retarder (0.1% by weight). This Sample had a density of 14.2 ppg. The vitrified shale was PRESSUR-SEAL® FINE LCM material.

Sample 46 comprised water, Class A Portland Cement (19.5% by weight), Class A CKD (3.25% by weight), vitrified shale (3.25% by weight), POZMIX® A cement additive (61% by weight), hydrated lime (13% by weight), HALAD® 23 fluid loss control additive (0.6% by weight), and "HR®-5" set retarder (0.1% by weight). This Sample had a density of 14.2 ppg. The vitrified shale was PRESSUR-SEAL® FINE LCM material.

The results of the fluid loss and thickening time tests are set forth in the table below.

TABLE 11

Unfoamed Thickening Time Tests:
Class A Cement, Class A CKD, Shale, Fly Ash, and/or Lime

| Sample | Portland Cement Class A (% by wt) | CKD Class A (% by wt) | Vitrified Shale[1] (% by wt) | POZMIX ® A Additive (% by wt) | Hydrated Lime (% by wt) | Thickening Time to 70 BC at 140° F. (hr:min) |
|---|---|---|---|---|---|---|
| 44 | 26 | 0 | 0 | 61 | 13 | 2:57 |
| 45 | 19.5 | 6.5 | 0 | 61 | 13 | 2:20 |
| 46 | 19.5 | 2.25 | 2.25 | 61 | 13 | 3:12 |

[1]The vitrified shale used was "PRESSUR-SEAL ® FINE LCM" material.

EXAMPLE 12

A series of sample sealant compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below. In this table, percent by weight is based on the weight of the Portland cement, CKD, shale, fly ash, and/or lime in the samples.

TABLE 12

Unfoamed Compressive Strength Tests:
Class H Cement, Class H CKD, Shale, Fly Ash, and/or Lime

| Sample | Portland Cement Class H (% by wt) | CKD Class H (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| 47 | 26 | 0 | 0 | 61 | 13 | 704 |
| 48 | 19.5 | 6.5 | 0 | 61 | 13 | 576 |
| 49 | 20.7 | 5.3 | 0 | 61 | 13 | 592 |
| 50 | 23.3 | 2.7 | 0 | 61 | 13 | 627 |
| 51 | 19.4 | 3.3 | 3.3 | 61 | 13 | 626 |
| 52 | 20.7 | 2.65 | 2.65 | 61 | 13 | 619 |
| 53 | 23.3 | 1.35 | 1.35 | 61 | 13 | 594 |

[1]The vitrified shale used was "PRESSUR-SEAL ® FINE LCM" material.

EXAMPLE 13

An additional sample sealant composition was prepared and subjected to a fluid loss test at 140° F. in accordance with API Specification 10. Sample 54 comprised water, Class H Portland Cement (19.5% by weight), Class H CKD (3.3% by weight), vitrified shale (3.3% by weight), POZMIX® A cement additive (61% by weight), hydrated lime (13% by weight), HALAD® 23 fluid loss control additive (0.6% by weight), and HR®-5 set retarder (0.1% by weight). In this Example, percent by weight is based on the weight of the Portland cement, CKD, shale, fly ash, and lime in the Sample. This Sample had a density of 14.2 ppg. Accordingly, Sample 54 had a Portland cement-to-CKD weight ratio of 75:25. The vitrified shale was PRESSUR-SEAL® FINE LCM material.

The result of this fluid loss test is set forth in the table below.

TABLE 13

Unfoamed Fluid Loss Test:
Class H Cement, Class H CKD, Shale, Fly ash, and Lime

| Sample | Portland Cement Class H (% by wt) | CKD Class H (% by wt) | Vitrified Shale[1] (% by wt) | POZMIX ® A Additive (% by wt) | Hydrated Lime (% by wt) | Fluid Loss in 30 min API at 140° F. (ml) |
|---|---|---|---|---|---|---|
| 54 | 19.5 | 3.3 | 3.3 | 61 | 13 | 117 |

[1] The vitrified shale used was "PRESSUR-SEAL ® FINE LCM" material.

EXAMPLE 14

A series of sample sealant compositions were prepared at room temperature and subjected to 24-hour compressive strength tests at 140° F. in accordance with API Specification 10. Sufficient water was included in each sample to provide a density of about 14.2 ppg.

The results of the compressive strength tests are set forth in the table below. In this table, percent by weight is based on the weight of the Portland cement, CKD, shale, fly ash, and/or lime in the samples.

Accordingly, Examples 10-14 indicate that sealant compositions comprising Portland cement, CKD, fly ash, hydrated lime, and optionally vitrified shale may have suitable compressive strengths, thickening times, and/or fluid loss properties for a particular application.

EXAMPLE 15

A series of foamed sample sealant compositions were prepared in accordance with the following procedure. For each sample, a base sample composition was prepared that comprised water, Class A Portland cement, Class A CKD, vitrified shale, "POZMIX® A" cement additive (61% by weight), and hydrated lime (13% by weight). In this Example, percent by weight is based on the weight of the Portland cement, CKD, shale, fly ash, and/or lime in the samples. The samples had a density of 14.2 ppg. The vitrified shale used was PRESSUR-SEAL® FINE LCM material. The amounts of CKD, Portland cement, and vitrified shale were varied as shown in the table below. ZONESEAL® 2000 foaming additive was then added to each base sample composition in an amount of 2% bvow. Next, each base sample composition was foamed down to about 12 ppg. After preparation, the resulting foamed sample compositions were subjected to 10-day compressive strength tests at 140° F. in accordance with API Specification 10.

The results of the compressive strength tests are set forth in the table below.

TABLE 14

Unfoamed Compressive Strength Tests:
Class G Cement, Class G CKD, Shale, Fly Ash, and/or Lime

| Sample | Portland Cement Class G (% by wt) | CKD Class G (% by wt) | Vitrified Shale[1] (% by wt) | POZMIX ® A Additive (% by wt) | Hydrated Lime (% by wt) | 24-Hour Compressive Strength at 140° F. (psi) |
|---|---|---|---|---|---|---|
| 55 | 26 | 0 | 0 | 61 | 13 | 491 |
| 56 | 19.5 | 6.5 | 0 | 61 | 13 | 526 |
| 57 | 20.7 | 5.3 | 0 | 61 | 13 | 474 |
| 58 | 23.3 | 2.7 | 0 | 61 | 13 | 462 |
| 59 | 19.4 | 3.3 | 3.3 | 61 | 13 | 523 |
| 60 | 20.7 | 2.65 | 2.65 | 61 | 13 | 563 |

[1] The vitrified shale used was "PRESSUR-SEAL ® FINE LCM" material.

TABLE 15

Foamed Compressive Strength Tests:
Class A Cement, Class A CKD, Shale, Fly Ash, and/or Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 10-Day Compressive Strength at 140° F. (psi) |
|---|---|---|---|---|---|---|
| 61 | 26 | 0 | 0 | 61 | 13 | 1,153 |
| 62 | 19.5 | 6.5 | 0 | 61 | 13 | 1,151 |
| 63 | 20.7 | 5.3 | 0 | 61 | 13 | 1,093 |
| 64 | 23.3 | 2.7 | 0 | 61 | 13 | 950 |
| 65 | 19.4 | 3.3 | 3.3 | 61 | 13 | 1,161 |
| 66 | 20.7 | 2.65 | 2.65 | 61 | 13 | 1,009 |
| 67 | 23.3 | 1.35 | 1.35 | 61 | 13 | 1,231 |

[1]The vitrified shale used was "PRESSUR-SEAL ® FINE LCM" material.

EXAMPLE 16

A series of foamed sample sealant compositions were prepared in accordance with the following procedure. For each sample, a base sample composition was prepared that comprised water, Class A Portland cement, Class A CKD, vitrified shale, "POZMIX® A" cement additive (61% by weight), and hydrated lime (13% by weight). In this Example, percent by weight is based on the weight of the Portland cement, CKD, shale, fly ash, and/or lime in the samples. The samples had a density of 14.2 ppg. The vitrified shale used was PRESSUR-SEAL® FINE LCM material. The amounts of CKD, Portland cement, and vitrified shale were varied as shown in the table below. ZONESEAL® 2000 foaming additive was then added to each base sample composition in an amount of 2% bvow. Next, each base sample composition was foamed down to about 12 ppg. After preparation, the resulting foamed sample compositions were subjected to 72-hour compressive strength tests at 140° F. in accordance with API Specification 10.

The results of the compressive strength tests are set forth in the table below.

EXAMPLE 17

A foamed sample sealant composition was prepared in accordance with the following procedure. A base sample composition was prepared that comprised water, Class G Portland cement (19.5% by weight), Class G CKD (6.5% by weight), POZMIX® A cement additive (61% by weight), and hydrated lime (13% by weight). In this Example, percent by weight is based on the weight of the Portland cement, CKD, fly ash, and/or lime in the Sample. ZONESEAL® 2000 foaming additive was then added to each base sample composition in an amount of 2% bvow. Next, the base sample was foamed down to about 12 ppg. After preparation, the resulting foamed sample composition was subjected to a 72-hour compressive strength test at 140° F. in accordance with API Specification 10.

TABLE 16

Foamed Compressive Strength Tests:
Class A Cement, Class A CKD, Shale, Fly Ash, and/or Lime

| Sample | Portland Cement Class A (% by wt) | CKD Class A (% by wt) | Vitrified Shale[1] (% by wt) | POZMIX ® A Additive (% by wt) | Hydrated Lime (% by wt) | 72-Hour Compressive Strength at 140° F. (psi) |
|---|---|---|---|---|---|---|
| 68 | 26 | 0 | 0 | 61 | 13 | 1,057 |
| 69 | 19.5 | 6.5 | 0 | 61 | 13 | 969 |
| 70 | 20.7 | 5.3 | 0 | 61 | 13 | 984 |
| 71 | 19.4 | 3.3 | 3.3 | 61 | 13 | 921 |
| 72 | 20.7 | 2.65 | 2.65 | 61 | 13 | 811 |
| 73 | 23.3 | 1.35 | 1.35 | 61 | 13 | 969 |

[1]The vitrified shale used was PRESS-SEAL ® FINE LCM material.

The result of the compressive strength test is set forth in the table below.

TABLE 17

Foamed Compressive Strength Tests:
Class G Cement, Class G CKD, Fly Ash, and Lime

| Sample | Portland Cement Class G (by wt) | CKD Class G (by wt) | POZMIX ® A Additive (by wt) | Hydrated Lime (by wt) | 72-Hour Compressive Strength at 140° F. (psi) |
|---|---|---|---|---|---|
| 74 | 19.5 | 6.5 | 61 | 13 | 777 |

Accordingly, Examples 15-17 indicate that foamed sealant compositions comprising Portland cement, CKD, fly ash, hydrated lime, and optionally vitrified shale may have suitable compressive strengths for a particular application.

EXAMPLE 18

A series of sample sealant compositions were prepared at room temperature and subjected to 24-hour compressive strength tests at 180° F. in accordance with API Specification 10. The sample compositions comprised water, Class A CKD, Class A Portland cement, zeolite, vitrified shale, and hydrated lime. The vitrified shale used was PRESSUR-SEAL° FINE LCM material. The amount of each component was varied as shown in the table below.

The results of the compressive strength tests are set forth in the table below. In this table, percent by weight is based on the weight of the Portland cement, CKD, shale, zeolite, and/or lime in the samples.

TABLE 18

Unfoamed Compressive Strength Tests:
Class A Cement, Class A CKD, Zeolite, Shale, and/or Lime

| Sample | Density (ppg) | Portland Cement Class A (% by wt) | CKD Class A (% by wt) | Zeolite (% by wt) | Vitrified Shale[1] (% by wt) | Hydrated Lime (% by wt) | 24-Hour Compressive Strength at 180° F. (psi) |
|---|---|---|---|---|---|---|---|
| 75 | 13.3 | 50 | 25 | 25 | 0 | 0 | 1,915 |
| 76 | 12.75 | 50 | 25 | 12.5 | 12.5 | 0 | 2,190 |
| 77 | 11.6 | 0 | 75 | 10 | 25 | 0 | 31.6 |
| 78 | 12.8 | 25 | 50 | 23.5 | 0 | 0 | 875 |
| 79 | 12.5 | 25 | 50 | 12.5 | 12.5 | 0 | 923 |
| 80 | 11.5 | 0 | 70 | 10 | 15 | 5 | 116.4 |

[1]The vitrified shale used was PRESSUR-SEAL ® FINE LCM material.

EXAMPLE 19

An additional foamed sample sealant composition was prepared in accordance with the following procedure. A base sample composition was prepared that comprised water, Class A Portland cement, Class A CKD, and zeolite. This base sample had a density of 14.2 ppg. ZONESEAL® 2000 foaming additive was then added in an amount of 2% bvow. Next, the base sample was foamed down to about 12 ppg. After preparation, the resulting foamed sample composition was subjected to a 72-hour compressive strength test at 140° F. in accordance with API Specification 10.

The result of the compressive strength test is set forth in the table below. In this table, percent by weight is based on the weight of the Portland cement, CKD, and zeolite in the Sample.

TABLE 19

Foamed Compressive Strength Tests:
Class A Cement, Class A CKD, and Zeolite

| Sample | Base Density (ppg) | Foam Density (ppg) | Portland Cement Class A (% by wt) | CKD Class A (% by wt) | Zeolite (% by wt) | 72-Hour Compressive Strength at 140° F. (psi) |
|---|---|---|---|---|---|---|
| 81 | 13.35 | 12 | 50 | 25 | 25 | 972 |

EXAMPLE 20

An additional sample sealant composition was prepared at room temperature and subjected to a 24-hour compressive strength test at 180° F. in accordance with API Specification 10. Sample 82 comprised water, Portland Class H Cement, Class H CKD, Zeolite, and vitrified shale. The vitrified shale used was PRESSUR-SEAL® FINE LCM material.

TABLE 20

Unfoamed Compressive Strength Tests:
Class H Cement, Class H CKD, Zeolite and Shale

| Sample | Density (ppg) | Portland Cement Class H (% by wt) | CKD Class H (% by wt) | Zeolite (% by wt) | Vitrified Shale[1] (% by wt) | 24-Hour Compressive Strength at 180° F. (psi) |
|---|---|---|---|---|---|---|
| 82 | 15.2 | 50 | 25 | 12.5 | 12.5 | 2,280 |

[1]The vitrified shale used was PRESSUR-SEAL ® FINE LCM material.

The result of the compressive strength test is set forth in the table below. In this table, percent by weight is based on the weight of the Portland cement, CKD, zeolite, and shale in the Sample.

EXAMPLE 21

An additional sample sealant composition was prepared at room temperature and subjected to thickening time and fluid loss tests at 140° F. in accordance with API Specification 10. Sample 83 comprised Class A Portland Cement (50% by weight), Class A CKD (25% by weight), zeolite (12.5% by weight), vitrified shale (12.5% by weight), "HALAD® 23" fluid loss control additive (0.75% by weight), and "HR®-5" set retarder (0.5% by weight). In this Example, percent by weight is based on the weight of the Portland cement, CKD, zeolite, and shale in the Sample. This Sample had a density of 12.75 ppg. The vitrified shale used was "PRESSUR-SEAL® FINE LCM" material.

The results of the fluid loss and thickening time tests are set forth in the table below.

TABLE 21

Unfoamed Thickening Time and Fluid Loss Tests: Class A Cement, Class A CKD, Zeolite and Shale

| Sample | Portland Cement Class A (% by wt) | CKD Class A (% by wt) | Zeolite (% by wt) | Vitrified Shale[1] (% by wt) | Thickening Time to 70 BC at 140° F. (hr:min) | Fluid Loss in 30 min at 140° F. (ml) |
|---|---|---|---|---|---|---|
| 83 | 50 | 25 | 12.5 | 12.5 | 8:54 | 196 |

[1]The vitrified shale used was PRESSUR-SEAL ® FINE LCM material.

Accordingly, Examples 18-21 indicate that foamed and unfoamed sealant compositions comprising Portland cement, CKD, zeolite, and optionally vitrified shale may have suitable compressive strengths for a particular application.

EXAMPLE 22

A series of sample sealant compositions were prepared at room temperature and subjected to 24-hour compressive strength tests at 190° F. in accordance with API Specification 10. The sample compositions comprised water, slag cement, Class H CKD, Class H Portland cement, sodium carbonate, and hydrated lime. The slag cement contained sodium carbonate in an amount of 6% by weight. The amount of each component was varied as shown in the table below.

The results of the compressive strength tests are set forth in the table below. In this Example, percent by weight is based on the weight of the Portland cement, CKD, slag cement, and/or lime in the samples.

TABLE 22

Unfoamed Compressive Strength Tests: Class H Cement, Class H CKD, Slag Cement, and/or Lime

| Sample | Density (ppg) | Portland Cement Class H (% by wt) | CKD Class H (% by wt) | Slag Cement (% by wt) | Hydrated Lime (% by wt) | 24-Hour Compressive Strength at 190° F. (psi) |
|---|---|---|---|---|---|---|
| 84 | 13.2 | 0 | 50 | 45 | 5 | 123.6 |
| 85 | 13.6 | 0 | 50 | 50 | 0 | 170.3 |
| 86 | 14 | 30 | 50 | 20 | 0 | 183.2 |
| 87 | 15 | 30 | 20 | 50 | 0 | 563 |

EXAMPLE 23

A series of foamed sample sealant compositions were prepared at room temperature and subjected to 72-hour compressive strength tests at 140° F. in accordance with API Specification 10. For each sample, a base sample composition comprised water, slag cement, Class H CKD, Class H Portland cement, and hydrated lime. The amount of each component was varied as shown in the table below. The slag cement contained sodium carbonate in an amount of 6% by weight. ZONESEAL® 2000 foaming additive was then added to each base sample composition in an amount of 2% bvow. Next, each base sample composition was foamed down to about 11 ppg. After preparation, the resulting foamed sample composition was subjected to a 72-hour compressive strength test at 140° F. in accordance with API Specification 10.

The result of the compressive strength tests are set forth in the table below. In this table, percent by weight is based on the weight of the Portland cement, CKD, slag cement, and/or lime in the samples.

TABLE 23

Foamed Compressive Strength Tests:
Class H Cement, Class H CKD, Slag Cement, and/or Lime

| Sample | Base Density (ppg) | Foam Density (ppg) | Portland Cement Class H (% by wt) | CKD Class H (% by wt) | Slag Cement (% by wt) | Hydrated Lime (% by wt) | 72-Hour Compressive Strength at 140° F. (psi) |
|---|---|---|---|---|---|---|---|
| 88 | 13.63 | 11 | 0 | 50 | 45 | 5 | 148.9 |
| 89 | 13.68 | 11 | 0 | 50 | 50 | 0 | 161.1 |
| 90 | 14.07 | 11 | 30 | 50 | 20 | 0 | 125 |

Accordingly, Examples 22-23 indicate that foamed and unfoamed sealant compositions comprising CKD, slag cement, optionally hydraulic cement, and optionally hydrated lime may have suitable compressive strengths for a particular application.

EXAMPLE 24

A series of sample sealant compositions were prepared at room temperature and subjected to 24-hour compressive strength tests at 180° F. in accordance with API Specification 10. The sample compositions comprised water, Portland Cement, CKD, metakaolin, and vitrified shale. The amount of each component was varied as shown in the table below. The vitrified shale used was PRESSUR-SEAL® FINE LCM material. Class A Portland Cement was used for this series of tests, except that Class H Portland Cement was used in Sample 93. Class A CKD was used for this series of tests, except that Class H CKD was used in Sample 93.

The results of the compressive strength tests are set forth in the table below. In this table, percent by weight is based on the weight of the Portland cement, CKD, metakaolin, and/or shale in the samples.

TABLE 24

Compressive Strength Tests:
Portland Cement, CKD, Metakaolin, and/or Shale

| Sample | Density (ppg) | Portland Cement (% by wt) | CKD (% by wt) | Metakaolin (% by wt) | Vitrified Shale[1] (% by wt) | 24-Hour Compressive Strength at 180° F. (psi) |
|---|---|---|---|---|---|---|
| 91 | 12.75 | 50 | 25 | 12.5 | 12.5 | 1,560 |
| 92 | 13.5 | 50 | 25 | 25 | 0 | 1,082 |
| 93 | 13 | 25 | 50 | 12.5 | 12.5 | 1,410 |

[1]The vitrified shale used was "PRESSUR-SEAL ® FINE LCM" material.

EXAMPLE 25

A series of foamed sample sealant compositions were prepared at room temperature and subjected to 72-hour compressive strength tests at 180° F. in accordance with API Specification 10. For each sample, a base sample composition was prepared that comprised water, Portland Cement, CKD, metakaolin, and vitrified shale. The amount of each component was varied as shown in the table below. The vitrified shale used was PRESSUR-SEAL® FINE LCM material. Class A Portland Cement was used for this series of tests, except that Class H Portland Cement was used in Sample 96. Class A CKD was used for this series of tests, except that Class H CKD was used in Sample 96. ZONESEAL® 2000 foaming additive was then added to each base sample composition in an amount of 2% bvow. Next, each base sample composition was foamed down to the density shown in the table below.

The results of the compressive strength tests are set forth in the table below. In this Example, percent by weight is based on the weight of the Portland cement, CKD, metakaolin, and/or shale in the samples.

TABLE 25

Foamed Compressive Strength Tests:
Portland Cement, CKD, Metakaolin, and/or Shale

| Sample | Base Density (ppg) | Foam Density (ppg) | Portland Cement (% by wt) | CKD (% by wt) | Metakaolin (% by wt) | Vitrified Shale[1] (% by wt) | 72-Hour Compressive Strength at 180° F. (psi) |
|---|---|---|---|---|---|---|---|
| 94 | 12.75 | 9.85 | 50 | 25 | 12.5 | 12.5 | 651 |
| 95 | 13.5 | 9.84 | 50 | 25 | 25 | 0 | 512 |
| 96 | 13 | 9.57 | 25 | 50 | 12.5 | 12.5 | 559 |

[1]The vitrified shale used was PRESSUR-SEAL ® FINE LCM material.

Accordingly, Examples 24-25 indicate that foamed and unfoamed sealant compositions comprising hydraulic cement, CKD, metakaolin, and optionally vitrified shale may have suitable compressive strengths for a particular application.

EXAMPLE 26

Twenty-nine different sample sealant compositions (i.e., Samples 97-125) were prepared. Samples 97-110 and the resulting set cements were then tested to determine their respective 24-hour compressive strengths. As set forth below, the respective test results for Slurries 97-110 demonstrate that samples comprising cement, CKD, and pumicite may provide suitable compressive strengths for certain applications. The remainder of the samples was used for additional testing in Example 27 below.

Samples 97-125 were prepared by dry blending dry components with cement prior to adding water to form the respective slurry. Samples 97-106 and 109-125 included Holcem ASTM Type III cement. Samples 107 and 108 included TXI Lightweight cement. The pumicite included in Samples 100, 103, and 105-125 was 200-mesh pumicite. Liquid additives, if any, were added to the water prior to combination with the cement. Sufficient water was included in Samples 97-99 and 120-123 to provide a density of 12.5 lb/gal. Sufficient water was included in Samples 100-119 to provide a density of 12 lb/gal. Sufficient water was included in Samples 124 and 125 to provide a density of 11 lb/gal. The particular composition of each sample is provided in the table below.

After Samples 97-110 were prepared, the sample slurries were subjected to 24-hour compressive strength tests at 185° F. in accordance with API Recommended Practice 10B. The results of this series of tests are provided in the table below. In this table, by weight of cement (or "bwoc") is based on the amount of the cement, CKD, pumicite, glass beads, and/or bentonite in the samples.

TABLE 26

Compressive Strength Tests:
Cement, CKD, Pumicite, Silica, Lime, Bentonite, and/or Glass Beads

| Sample | Water[1] (gal/sk) | Cement[2] (% bwoc) | CKD (% bwoc) | Pumicite (% bwoc) | Silica[3] (% bwoc) | Lime (% bwoc) | Bentonite (% bwoc) | Glass Beads[4] (% bwoc) | 185° F. 24-Hour Comp. Strength (psi) |
|---|---|---|---|---|---|---|---|---|---|
| 97 | 11.35 | 75 | 25 | — | 10 | — | — | — | 905 |
| 98 | 10.35 | 65 | 35 | — | — | — | — | — | 471 |
| 99 | 10.52 | 75 | 25 | — | — | — | — | — | 556 |
| 100 | 11.92 | 50 | 25 | 25 | — | 5 | — | — | 549 |
| 101 | 12.41 | 75 | 25 | — | — | — | — | — | 447 |
| 102 | 12.23 | 65 | 35 | — | — | — | — | — | 319 |
| 103 | 12.62 | 75 | 12.5 | 12.5 | — | 5 | — | — | 441 |
| 104 | 13.42 | 75 | 25 | — | 10 | — | — | — | 261 |
| 105 | 12.92 | 50 | 25 | 25 | 10 | 5 | — | — | 920 |
| 106 | 12.37 | 75 | — | 25 | — | 5 | — | — | 1012 |
| 107 | 12.19 | 50 | 25 | 25 | 10 | 5 | — | — | 939 |
| 108 | 12.19 | 50 | 25 | 25[5] | 10 | 5 | — | — | 786 |
| 109 | 12.92 | 50 | 25 | 25[5] | 10 | 5 | — | — | 805 |
| 110 | 12.47 | 50 | 25 | 25 | 10 | — | — | — | 734 |
| 111 | 11.89 | 65 | 17 | 17 | — | — | — | — | — |
| 112 | 11.89 | 65 | 17 | 17 | — | — | — | — | — |
| 113 | 12.65 | 65 | 12 | 23 | 8 | — | — | — | — |
| 114 | 12.94 | 65 | 29 | 6 | 8 | — | — | — | — |
| 115 | 12.76 | 65 | 6 | 29 | 10 | — | — | — | — |
| 116 | 13.1 | 75 | 10 | 25 | — | — | — | — | — |
| 117 | 13.38 | 75 | 13 | 25 | — | — | — | — | — |
| 118 | 10.91 | 57 | 5 | 38 | — | — | — | — | — |
| 119 | 13.28 | 58 | 7 | 35 | — | — | — | — | — |
| 120 | 12.98 | 50 | 5 | 42 | — | — | 3 | — | — |
| 121 | 10.91 | 50 | 5 | 42 | — | — | 3 | — | — |
| 122 | 10.91 | 50 | 5 | 42 | — | — | 3 | — | — |
| 123 | 10.91 | 50 | 5 | 42 | — | — | 3 | — | — |
| 124 | 10.85 | 50 | 5 | 35 | — | — | — | 10 | — |
| 125 | 10.85 | 50 | 5 | 35 | — | — | — | 10 | — |

[1]The amount of water is provided in gallons per 100-pound sack of dry blend.
[2]Holcem ASTM Type III Cement was used in each sample, except TXI Lightweight cement was used in Samples 107 and 108.
[3]The amorphous silica included in the sample slurries was Silicalite ™ cement additive, available from Halliburton Energy Services.
[4]The glass beads included in certain sample slurries were 8000# psi beads with a specific gravity of 42, available from 3M located in Minnesota.
[5]Samples 108 and 109 contained a composite of 5-, 10-, 200-, and 325-mesh pumicite in equal amounts.

EXAMPLE 27

Additional tests were performed using Samples 97, 105, and 111-125 from Example 26. In addition to the components identified in Example 26, D-Air™ 3000 defoaming additive and FWCA™ free water control additive were also added to each of these samples in the amount indicated in the table below. Additionally, each of these samples also included HR®-601 retarder in the amount indicated in the table below, except for Sample 105B in which HR®-5 retarder was included. Samples 112-115, 117-122, 124, and 125 further included HALAD® 344 fluid loss control additive in the amount indicated in the table below.

After preparation, the samples and resulting set cements were then tested to determine their respective fluid loss properties, thickening times, and free water content, in accordance with API Recommended Practice 10B. An ultrasonic cement analyzer was used to determine a seventy-hour compressive strength value ("UCA$_{72}$ hrs"). Immediately after removal from the UCA, crush strengths were determined using a Tinius Olsen tester.

The results of this series of tests are provided in the table below. In this table, by weight of cement (or "bwoc") is based on the amount of the cement, CKD, pumicite, glass beads, and/or bentonite in the samples.

TABLE 27

Test Results:
Cement, CKD, Pumicite, Silica, Lime, Bentonite, and/or Glass Beads

| Sample | Defoamer (% bwoc) | Set Retarder (% bwoc) | FWCA (% bwoc) | FLCA (% bwoc) | Fluid Loss 155° F. (cc/30 min) | Thick. Time 70 bc 155° F. (hr:min) | Free Water 45 inc. 155° F. (%) | UCA 72 hr 190° F. (psi) | Crush 72 hr (psi) |
|---|---|---|---|---|---|---|---|---|---|
| 97a  | 0.25 | 1    | 0.3  | —    | 280 | 5:50 | 0     | 679    | 691  |
| 97b  | 0.25 | 0.5  | 0.3  | —    | 240 | 3:35 | 0     | 544    | 680  |
| 97c  | 0.25 | 0.75 | 0.3  | —    | 290 | 3:54 | —     | —      | —    |
| 105a | 0.5  | 1    | 0.3  | —    | 294 | 6:40 | Trace | 1118.8 | 1127 |
| 105b | 0.5  | 1    | 0.3  | —    | 235 | —    | 1.6   | —      | —    |
| 105c | 0.5  | 0.5  | 0.3  | —    | 321 | 3:03 | Trace | 1066   | 1092 |
| 105d | 0.5  | 0.75 | 0.3  | —    | 290 | 4:09 | 0     | —      | —    |
| 111  | 0.25 | 0.75 | 0.3  | —    | 407 | —    | —     | —      | —    |
| 112  | 0.25 | 0.75 | 0.2  | 0.2  | 254 | —    | —     | —      | —    |
| 113  | 0.25 | 0.75 | 0.25 | 0.15 | 259 | —    | —     | —      | 739  |
| 114  | 0.25 | 0.75 | 0.25 | 0.15 | —   | —    | —     | 392    | 472  |
| 115  | 0.25 | 0.75 | 0.3  | 0.1  | 366 | —    | —     | —      | —    |
| 116  | 0.25 | 0.75 | 0.3  | —    | 438 | —    | —     | —      | —    |
| 117  | 0.25 | 0.75 | 0.3  | 0.1  | 460 | —    | —     | —      | —    |
| 118  | 0.25 | 0.5  | 0.3  | 0.15 | 394 | —    | 2 ml  | —      | —    |
| 119  | 0.25 | 0.3  | 0.3  | 0.3  | 143 | —    | Trace | —      | —    |
| 120  | 0.25 | 0.3  | 0.3  | 0.2  | 280 | 3:27 | 0     | —      | 1024 |
| 121  | 0.25 | 0.4  | 0.3  | 0.2  | 132 | 3:40 | 0     | —      | —    |
| 122  | 0.25 | 0.5  | 0.3  | 0.1  | 208 | 3:34 | 0     | 2610   | 2110 |
| 123  | 0.25 | 0.5  | 0.3  | —    | 281 | 3:55 | 0     | —      | —    |
| 124  | —    | 0.3  | 0.3  | 0.2  | 256 | 5:16 | 0     | 1193   | —[1] |
| 125  | 0.25 | 0.4  | 0.3  | 0.2  | 235 | 5:52 | 0     | 1400   | —[1] |

[1] The 72-hour UCA crush strengths were not determined for Slurries 124 and 125 because the slurry cracked.

The 24-hour UCA compressive and crush strengths were also determined for Samples 124 and 125. For Sample 124, the 24-hour UCA compressive and crush strengths were 1107 psi and 1021 psi, respectively. For Sample 125, the 24-hour UCA compressive and crush strengths were 1500 psi and 1024 psi, respectively.

Additionally, the rheological properties of the samples were also determined using a Fann Model 35 viscometer at the temperature indicated in the table below using a bob and sleeve and spring #1. The plastic viscosity and the yield points of the samples were calculated from Best Rheology using the Generalized Hershel Bulkley Model. The results of this series of tests are provided in the table below.

TABLE 28

Rheological Properties:
Cement, CKD, Pumicite, Silica, Lime, Bentonite, and/or Glass Beads

| Sample | Temp (° F.) | Rotational Viscometer (Bob & Sleeve; Spring #1) | | | | | | | | Plastic Viscosity | Yield Point |
|---|---|---|---|---|---|---|---|---|---|---|---|
| | | 600 | 300 | 200 | 100 | 60 | 30 | 6 | 3 | | |
| 97a | 80 | 116 | 73 | 56 | 37 | 27 | 18 | 9 | 8 | 54 | 19 |
| | 155 | 162 | 130 | 95 | 64 | 52 | 41 | 30 | 28 | 99 | 31 |
| 97b | 80 | 147 | 95 | 72 | 46 | 35 | 25 | 16 | 15 | 74 | 21 |
| | 155 | 151 | 125 | 90 | 59 | 46 | 36 | 25 | 24 | 99 | 26 |
| 97c | 80 | 131 | 72 | 48 | 37 | 27 | 20 | 19 | 18 | 53 | 20 |
| | 155 | 142 | 123 | 90 | 64 | 53 | 44 | 32 | 30 | 88 | 37 |
| 105a | 80 | 126 | 78 | 60 | 38 | 27 | 18 | 9 | 8 | 60 | 18 |
| | 155 | 129 | 95 | 69 | 44 | 34 | 26 | 18 | 17 | 77 | 18 |
| 105b | 80 | 120 | 76 | 56 | 34 | 24 | 15 | 6 | 4 | 63 | 13 |
| | 155 | 68 | 45 | 29 | 16 | 11 | 6 | 2 | 2 | 44 | 1 |
| 105c | 80 | 115 | 70 | 53 | 33 | 24 | 16 | 8 | 8 | 56 | 14 |
| | 155 | 100 | 74 | 53 | 34 | 27 | 21 | 14 | 13 | 60 | 14 |
| 105d | 80 | 129 | 84 | 62 | 39 | 29 | 20 | 10 | 8 | 68 | 16 |
| | 155 | 122 | 94 | 70 | 46 | 36 | 28 | 20 | 19 | 72 | 22 |
| 111 | 80 | 86 | 51 | 40 | 25 | 18 | 12 | 5 | 4 | 39 | 13 |
| | 155 | 105 | 80 | 59 | 40 | 32 | 25 | 18 | 17 | 60 | 21 |
| 112 | 80 | 68 | 38 | 28 | 16 | 11 | 6 | 2 | 1 | 22 | 5 |
| | 155 | 61 | 45 | 28 | 15 | 10 | 6 | 2 | 1 | 45 | 0 |
| 113 | 80 | 92 | 55 | 40 | 24 | 16 | 9 | 3 | 3 | 47 | 8 |
| | 155 | 89 | 57 | 40 | 23 | 15 | 9 | 4 | 3 | 51 | 6 |
| 114 | 80 | 96 | 55 | 41 | 25 | 17 | 11 | 3 | 2 | 45 | 10 |
| | 155 | 79 | 53 | 37 | 21 | 15 | 10 | 4 | 4 | 48 | 5 |
| 115 | 80 | 110 | 58 | 46 | 29 | 20 | 12 | 5 | 5 | 44 | 14 |
| | 155 | 107 | 79 | 54 | 33 | 24 | 17 | 11 | 10 | 69 | 10 |
| 116 | 80 | 85 | 61 | 48 | 35 | 28 | 15 | 9 | 7 | 39 | 22 |
| | 155 | 101 | 72 | 52 | 33 | 26 | 19 | 13 | 12 | 59 | 13 |
| 117 | 80 | 83 | 51 | 38 | 24 | 17 | 10 | 4 | 3 | 41 | 10 |
| | 155 | 86 | 61 | 41 | 25 | 18 | 13 | 8 | 8 | 54 | 7 |
| 118 | 80 | 115 | 72 | 56 | 36 | 25 | 16 | 5 | 4 | 54 | 18 |
| | 155 | 95 | 70 | 47 | 27 | 19 | 12 | 4 | 3 | 64 | 6 |
| 119 | 80 | 114 | 73 | 57 | 36 | 25 | 15 | 7 | 6 | 55 | 8 |
| | 155 | 75 | 52 | 35 | 20 | 13 | 8 | 3 | 2 | 48 | 4 |
| 120 | 80 | 129 | 86 | 65 | 40 | 28 | 18 | 5 | 4 | 69 | 17 |
| | 155 | 90 | 57 | 46 | 29 | 21 | 13 | 5 | 4 | 42 | 15 |
| 121 | 80 | 207 | 131 | 103 | 67 | 49 | 31 | 11 | 8 | 96 | 35 |
| | 155 | 155 | 115 | 81 | 49 | 34 | 21 | 7 | 5 | 99 | 16 |
| 122 | 80 | 202 | 120 | 94 | 61 | 44 | 29 | 13 | 11 | 89 | 31 |
| | 155 | 159 | 121 | 85 | 50 | 35 | 23 | 10 | 8 | 107 | 14 |
| 123 | 80 | 184 | 126 | 96 | 62 | 46 | 32 | 18 | 17 | 96 | 30 |
| | 155 | 165 | 146 | 103 | 91 | 71 | 55 | 40 | 37 | 83 | 63 |
| 124 | 80 | 265 | 178 | 141 | 93 | 69 | 45 | 17 | 15 | 128 | 50 |
| | 155 | 194 | 158 | 114 | 69 | 48 | 30 | 10 | 7 | 134 | 24 |
| 125 | 80 | 281 | 198 | 163 | 100 | 75 | 49 | 18 | 15 | 147 | 51 |
| | 155 | 216 | 175 | 124 | 77 | 56 | 41 | 14 | 9 | 147 | 28 |

Example 27 thus indicates that sealant compositions containing pumicite may provide suitable properties for certain applications.

EXAMPLE 28

Additional tests were performed using Samples 105-107 from Example 26. In particular, each of Samples 105-107 was extended using a set retarder (HR®-5 retarder). After remaining in a liquid state for 24 hours, each sample was activated using calcium chloride in an amount of 4% bwoc. The 72-hour compressive strength of the resultant set cement was then determined at the temperature indicated in the table below, in accordance with API Recommended Practice 10B. The results of this series of tests are provided in the table below. In this table, by weight of cement (or "bwoc") is based on the amount of the cement, CKD, and/or pumicite in the samples.7

TABLE 29

Extended Compressive Strength Tests:
Cement, CKD, and/or Pumicite

| Sample | Cement[1] (% bwoc) | CKD (% bwoc) | Pumicite (% bwoc) | Set Retarder (% bwoc) | Hours Liquid | Calcium Chloride (% bwoc) | 185° F. 72-Hour Comp. Strength (psi) |
|---|---|---|---|---|---|---|---|
| 105 | 50 | 25 | 25 | 1.5 | 24 | 4 | 1074 |
| 106 | 75 | — | 25 | 1 | 24 | 4 | 959 |
| 107 | 50 | 25 | 25 | 1 | 24 | 4 | 626 |

[1]Holcem ASTM Type III Cement was used in Samples 105 and 106, and TXI Lightweight cement was used in Sample 107.

Example 28 thus indicates that sealant compositions containing cement, CKD, and pumicite may be extended, for example, by use of appropriate set retarders.

EXAMPLE 29

Additional tests were performed using Samples 105-107 from Example 26. In particular, each of Samples 105-107 was foamed with air from a base density of 12 ppg to the density indicated in the table below. The foaming additive included in each sample was ZONESEAL® 2000 foaming additive in an amount of 2% by volume of water. The 72-hour compressive strength of the resultant set cement was then determined at the temperature indicated in the table below, in accordance with API Recommended Practice 10B. The results of this series of tests are provided in the table below. In this table, by weight of cement (or "bwoc") is based on the amount of the cement, CKD, and/or pumicite in the samples.

EXAMPLE 30

Five additional sample sealant compositions (i.e., Samples 126-130) were prepared. The samples and resulting set cements were then tested to determine their respective mechanical properties, fluid-loss properties, rheological properties, and the like. As set forth below, the respective test results for the five different samples demonstrate that samples comprising pumicite may provide suitable compressive strengths for certain applications.

Samples 126-130 were prepared by dry blending dry components with cement prior to adding water to form the respective sample. Liquid additives, if any, were added to the water prior to combination with the cement. Sufficient water was included in Samples 126-128 to provide a density of 10.5 ppg, and sufficient water was included in Slurries 129 and 130 to provide a density of 12 ppg. In addition to other components, each slurry included Holcem ASTM Type III cement, 200-mesh Pumicite, and Joppa CKD. The composition of each

TABLE 30

Foamed Compressive Strength Tests:
Cement, CKD, Pumicite, Silica and/or Lime

| Sample | Cement[1] (% bwoc) | CKD (% bwoc) | Pumicite (% bwoc) | Silica[2] (% bwoc) | Lime (% bwoc) | Foaming Additive (% bvow) | Base Density (ppg) | Foam Density (ppg) | Target Density (ppg) | 185° F. 72-Hour Comp. Strength (psi) |
|---|---|---|---|---|---|---|---|---|---|---|
| 105 | 50 | 25 | 25 | 10 | 5 | 2 | 12 | 9.52 | 10 | 411 |
| 106 | 75 | — | 25 | — | 5 | 2 | 12 | 9.36 | 10 | 343 |
| 107 | 50 | 25 | 25 | 10 | 5 | 2 | 12 | 9.76 | 10 | 561 |

[1]Holcem ASTM Type III Cement was used in Samples 105 and 106, and TXI Lightweight cement was used in Slurry 107.
[2]The amorphous silica included in the sample slurries was SILICALITE ™ cement additive, available from Halliburton Energy Services.

Example 29 thus indicates that sealant compositions containing cement, CKD, and pumicite may be foamed, for example, by use of appropriate foaming additives.

sample is listed in the table below. In this table, by weight of cement (or "bwoc") is based on the amount of the cement, pumicite, CKD, glass beads, and/or bentonite in the samples.

TABLE 31

Sample Sealant Compositions:
Cement, Pumicite, CKD, Bentonite, Silica Flour, and/or Glass Beads

| Sample | Density (ppg) | Water (gal/sk)[1] | Cement (% bwoc) | Pumicite (% bwoc) | CKD (% bwoc) | Bentonite (% bwoc) | Silica Flour[2] (% bwoc) | Glass Beads[3] (% bwoc) |
|---|---|---|---|---|---|---|---|---|
| 126 | 10.5 | 10.05 | 50 | 32 | 5 | — | — | 13 |
| 127 | 10.5 | 10.07 | 50 | 32 | 5 | — | — | 13 |
| 128 | 10.5 | 10.06 | 50 | 32 | 5 | — | — | 13 |
| 129 | 12 | 15 | 50 | 42 | 5 | 3 | 17 | — |
| 130 | 12 | 12.98 | 50 | 42 | 5 | 3 | — | — |

[1]The amount of water is provided in gallons per 100-pound sack of dry blend.
[2]The silica flour included in Sample 129 was SSA-1 ™ strength stabilizing additive, available from Halliburton Energy Services.
[3]The glass beads included in Samples 126-128 were 8000# psi beads with a specific gravity of 42, available from 3M located in Minnesota.

Sample 126 further included D-AIR™ 3000 defoaming additive (0.25% bwoc), FWCA™ free water control additive (0.15% bwoc), HR®-601 retarder (0.6% bwoc), and HALAD®-344 fluid loss control additive (0.6% bwoc).

Sample 127 further included D-AIR™ 3000 defoaming additive (0.25% bwoc), FWCA™ free water control additive (0.15% bwoc), HR®-601 retarder (0.3% bwoc), and HALA®-344 fluid loss control additive (0.4% bwoc).

Sample 128 further included D-AIR™ 3000 defoaming additive (0.25% bwoc), FWCA™ free water control additive (0.15% bwoc), HR®-601 retarder (0.4% bwoc), and HALAD®-344 fluid loss control additive (0.4% bwoc).

Sample 129 further included D-AIR™ 3000 defoaming additive (0.25% bwoc), FWCA™ free water control additive (0.25% bwoc), HR®-601 retarder (0.3% bwoc), and HALAD®-344 fluid loss control additive (0.5% bwoc), and SA-541™ suspending aid (0.3% bwoc).

Sample 130 further included D-Air™ 3000 defoaming additive (0.25% bwoc), FWCA™ free water control additive (0.3% bwoc), HR®-601 retarder (0.3% bwoc), and HALAD® 344 fluid loss control additive (0.2% bwoc).

After the samples were prepared, the samples and resulting set cements were then tested to determine their respective fluid loss properties, thickening times, and free water content at the temperatures indicated in the table below in accordance with API Recommended Practice 10B. Compressive strength development was tested using the UCA at specified temperatures and times. Specifically, the UCA was used to determine the time to 50 psi, time to 500 psi, and a twenty-four compressive strength value ("UCA$_{24}$ hrs"). Immediately after removal from the UCA, crush strengths were determined using a Tinius Olsen tester. Additionally, the Theological properties of the samples were also determined using a Fann Model 35 viscometer at the temperature indicated in the table below using a bob and sleeve and spring #1. The plastic viscosity and the yield points of the samples were calculated from Best Rheology using the Generalized Hershel Bulkley Model. The results of this series of tests are provided in the table below.

TABLE 32

Test Results:
Cement, Pumicite, CKD, Bentonite, Silica Flour, and/or Glass Beads

| Sample | Fluid Loss 200° F. (cc/30 min) | Thick. Time[1] 70 bc (hr:min) | Free Water[2] 45 inc. (%) | UCA 24 hr 190° F. (psi) | Crush 24 hr (psi) | 190° F. Time to 50 psi | 190° F. Time to 500 psi | 80° PV/YP | 155° PV/YP | 200° PV/YP |
|---|---|---|---|---|---|---|---|---|---|---|
| 126 | 58 | 11:45 | 0 | 873 | 2140 | 6:58 | 7:35 | 150/35 | — | 102/29 |
| 127 | 88 | 3:26 | 0 | 1027 | 2040 | 5:14 | 5:28 | 131/29 | — | 85/27 |
| 128 | — | 5:49 | — | — | — | — | — | — | — | — |
| 129 | 80 | 6:03 | Trace | 836 | 1024 | 4:51 | 5:52 | 65/13 | — | 60/15 |
| 130 | 280 | 3:27 | 0 | 1374 | 1367 | 4:52 | 8:37 | 69/17 | 42/15 | — |

[1]The thickening time tests were performed at 217° F., except the thickening time for Sample 130 was determined at 155° F.
[2]The free-water tests were performed at 200° F. for Samples 126-129. The free-water test for Sample 130 was determined at 155° F.

Example 30 thus indicates that sealant compositions containing pumicite may provide suitable properties for certain applications.

EXAMPLE 31

A series of sample sealant compositions (i.e., 131-142) were prepared at room temperature and subjected to 24-hour crush strength tests at 185° F. in accordance with API Specification 10 to determine force resistance properties of sealant compositions essentially free of Portland cement. The sample compositions were allowed to cure in the UCA at 185° F. for twenty-four hours. Immediately after removal from the UCA, crush strengths were determined using a Tinius Olsen tester.

Each of Samples 131-142 contained 200-mesh pumicite, Joppa CKD, lime, and water and were free of Portland cement.

The results of the crush strength tests are set forth in the table below. In this table, percent by weight is based on the weight of the pumicite and the CKD in the samples.

TABLE 33

Crush Strength Tests:
Pumicite, CKD, and Lime

| Sample | Density (ppg) | Water (gal/sk) | Pumicite (% by wt) | CKD (% by wt) | Lime (% by wt) | Crush 24 hr (psi) |
|---|---|---|---|---|---|---|
| 131 | 12.5 | 9.42 | 65 | 35 | 5 | 83.8 |
| 132 | 12.5 | 9.82 | 65 | 35 | 10 | 126.3 |
| 133 | 12.5 | 10.15 | 65 | 35 | 14 | 229 |
| 134 | 12.5 | 9.33 | 70 | 30 | 5 | 75.6 |
| 135 | 12.5 | 9.74 | 70 | 30 | 10 | 358 |
| 136 | 12.5 | 10.06 | 70 | 30 | 14 | 182.6 |
| 137 | 12.5 | 9.25 | 75 | 25 | 5 | 52.8 |
| 138 | 12.5 | 9.65 | 75 | 25 | 10 | 314 |
| 139 | 12.5 | 9.98 | 75 | 25 | 14 | 147 |
| 140 | 12.5 | 9.16 | 80 | 20 | 5 | 32.1 |
| 141 | 12.5 | 9.57 | 80 | 20 | 10 | 305 |
| 142 | 12.5 | 9.89 | 80 | 20 | 14 | 144.8 |

Example 31 thus indicates that sealant compositions containing pumicite, CKD, and lime and essentially free of Portland cement may have properties suitable for use in particular applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method comprising:
   placing a sealant composition that comprises cement kiln dust and is essentially free of Portland cement in a subterranean formation; and
   allowing the sealant composition to set.

2. The method of claim 1 wherein the Portland cement is classified as an API class A, C, G, or H cement or an ASTM Type I, II, or III cement.

3. The method of claim 1 wherein sealant composition further comprises water.

4. The method of claim 1 wherein the sealant composition consists essentially of the cement kiln dust and water.

5. The method of claim 1 wherein the sealant composition further comprises a natural pozzolan.

6. The method of claim 1 wherein the sealant composition further comprises pumicite.

7. The method of claim 1 wherein the sealant composition further comprises pumicite and lime.

8. The method of claim 1 wherein the sealant composition further comprises pumicite in a pumicite to cement kiln dust weight ratio of about 65/35 to about 80/20, and wherein the sealant composition further comprises lime in an amount of about 5% to about 15% by combined weight of the natural pozzolan and the cement kiln dust.

9. The method of claim 1 wherein the sealant composition further comprises an additive selected from the group consisting of fly ash, slag cement, metakaolin, shale, zeolite, and any combination thereof.

10. The method of claim 1 wherein the sealant composition further comprises an additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

11. The method of claim 1 wherein the sealant composition further comprises an additive selected from the group consisting of crystalline silica, amorphous silica, fumed silica, a salt, a fiber, a hydratable clay, a microsphere, rice husk ash, an elastomer, an elastomeric particle, a resin, latex, and any combination thereof.

12. The method of claim 1 wherein the sealant composition is foamed.

13. The method of claim 1 wherein the sealant composition is extended.

14. The method of claim 1 wherein allowing the sealant composition to set comprises allowing the sealant composition to set in an annulus between the subterranean formation and a conduit disposed in the subterranean formation.

15. The method of claim 1 wherein allowing the sealant composition to set comprises allowing the sealant composition to set so as to seal a void located in a conduit disposed in the subterranean formation, located in a cement sheath in an annulus between the conduit and the subterranean formation, and/or located in an annulus between the cement sheath and the subterranean formation.

16. The method of claim 1 wherein allowing the sealant composition to set comprises allowing the sealant composition to set so as to seal a portion of a gravel pack.

17. A method comprising:
   placing a hydraulic sealant composition that comprises cement kiln dust and water and is essentially free of Portland cement in a subterranean formation; and
   allowing the hydraulic sealant composition to set.

18. The method of claim 17 wherein the Portland cement is classified as an API class A, C, G, or H cement or an ASTM Type I, II, or III cement.

19. The method of claim 17 wherein the hydraulic sealant composition consists essentially of the cement kiln dust and the water.

20. The method of claim 17 wherein the hydraulic sealant composition further comprises a natural pozzolan.

21. The method of claim 17 wherein the hydraulic sealant composition further comprises pumicite.

22. The method of claim 17 wherein the hydraulic sealant composition further comprises pumicite and lime.

23. The method of claim 17 wherein the hydraulic sealant composition further comprises pumicite in a pumicite to cement kiln dust weight ratio of from about 65/35 to about 80/20, and wherein the sealant composition further comprises lime in an amount of about 5% to about 15% by combined weight of the natural pozzolan and the cement kiln dust.

24. The method of claim 17 wherein the hydraulic sealant composition comprises an additive selected from the group consisting of fly ash, slag cement, metakaolin, shale, zeolite, and any combination thereof.

25. The method of claim 17 wherein the hydraulic sealant composition comprises an additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, and any combination thereof.

26. The method of claim 17 wherein the hydraulic sealant composition comprises an additive selected from the group consisting of crystalline silica, amorphous silica, fumed silica, a salt, a fiber, a hydratable clay, a microsphere, rice husk ash, an elastomer, an elastomeric particle, a resin, latex, and any combination thereof.

27. The method of claim 17 wherein the hydraulic sealant composition is foamed.

28. The method of claim 17 wherein the hydraulic sealant composition is extended.

29. The method of claim 17 wherein allowing the hydraulic sealant composition to set comprises allowing the hydraulic sealant composition to set in an annulus between the subterranean formation and a conduit disposed in the subterranean formation.

30. The method of claim 17 wherein allowing the hydraulic sealant composition to set comprises allowing the hydraulic sealant composition to set so as to seal a void located in a conduit disposed in the subterranean formation, located in a cement sheath in an annulus between the conduit and the subterranean formation, and/or located in an annulus between the cement sheath and the subterranean formation.

31. The method of claim 17 wherein allowing the hydraulic sealant composition to set comprises allowing the hydraulic sealant composition to set so as to seal a portion of a gravel pack.

32. A method comprising:
placing a hydraulic sealant composition in a subterranean formation, wherein the hydraulic sealant composition consists essentially of:
pumicite,
lime,
cement kiln dust,
water, and
an additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, an oil-swellable particle, a water-swellable particle, a thixotropic additive, a gas, and any combination thereof; and
allowing the hydraulic cement composition to set.

* * * * *

UNITED STATES PATENT AND TRADEMARK OFFICE
CERTIFICATE OF CORRECTION

| | |
|---|---|
| PATENT NO. | : 7,743,828 B2 |
| APPLICATION NO. | : 12/606381 |
| DATED | : June 29, 2010 |
| INVENTOR(S) | : Craig W. Roddy et al. |

It is certified that error appears in the above-identified patent and that said Letters Patent is hereby corrected as shown below:

Title Page, Item [54], and Col. 1 Title, "Methods of Cementing in Subterranean Formations Using Cement Kiln Cement Kiln Dust in Compositions Having Reduced Portland Cement Content" should read --Methods of Cementing in Subterranean Formations Using Cement Kiln Dust in Compositions Having Reduced Portland Cement Content--

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,743,828 B2 | |
| APPLICATION NO. | : 12/606381 | |
| DATED | : June 29, 2010 | |
| INVENTOR(S) | : Craig W. Roddy et al. | |

It is certified that error appears in the above-identified patent and that said Letters Patent is hereby corrected as shown below:

The U.S. Patent Publication number in Column 7, line 34 reading "No. 2007/10056475 A1" should be corrected to --No. 2007/0056475 A1--.

Signed and Sealed this
Twenty-eighth Day of August, 2012

David J. Kappos
*Director of the United States Patent and Trademark Office*